US010345504B2

(12) United States Patent
Watanabe et al.

(10) Patent No.: US 10,345,504 B2
(45) Date of Patent: Jul. 9, 2019

(54) LIGHTING DEVICE, DISPLAY DEVICE, AND METHOD OF MANUFACTURING LIGHTING DEVICE

(71) Applicant: Sharp Kabushiki Kaisha, Sakai, Osaka (JP)

(72) Inventors: Hisashi Watanabe, Sakai (JP); Ryuzo Yuki, Sakai (JP); Mitsuhiro Murata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 136 days.

(21) Appl. No.: 15/512,590

(22) PCT Filed: Oct. 8, 2015

(86) PCT No.: PCT/JP2015/078569
§ 371 (c)(1),
(2) Date: Mar. 20, 2017

(87) PCT Pub. No.: WO2016/060052
PCT Pub. Date: Apr. 21, 2016

(65) Prior Publication Data
US 2017/0293067 A1 Oct. 12, 2017

(30) Foreign Application Priority Data
Oct. 15, 2014 (JP) ................................. 2014-210377

(51) Int. Cl.
F21V 8/00 (2006.01)
G02F 1/1333 (2006.01)

(52) U.S. Cl.
CPC ......... *G02B 6/0033* (2013.01); *G02B 6/0055* (2013.01); *G02B 6/0065* (2013.01);
(Continued)

(58) Field of Classification Search
CPC .. G02B 6/0033; G02B 6/0055; G02B 6/0065; G02B 6/0076; G02B 6/0031; G06F 17/00
See application file for complete search history.

(56) References Cited
U.S. PATENT DOCUMENTS 6,053,621 A * 4/2000 Yoneda ..................... F21K 9/00
356/237.2
8,445,578 B2 * 5/2013 Chung ................... B05D 5/068
524/423
(Continued)

FOREIGN PATENT DOCUMENTS

JP 06-082631 A 3/1994
JP 09-050028 A 2/1997
(Continued)

OTHER PUBLICATIONS

Official Communication issued in International Patent Application No. PCT/JP2015/078569, dated Dec. 22, 2015.

*Primary Examiner* — Anh T Mai
*Assistant Examiner* — Nathaniel J Lee
(74) *Attorney, Agent, or Firm* — Keating & Bennett, LLP

(57) ABSTRACT

A backlight device 13 includes LEDs 22, a light guide plate 24, and a light reflecting portion 34. The light guide plate 24 is a plate member and includes a light entrance surface 24a, an opposite edge surface 24d, and a light exit surface 24b. The light entrance surface 24a is an edge surface of the plate member and opposite the LEDs 22 and light emitted by the LEDs 22 enters the light guide plate 24 through the light entrance surface. The opposite edge surface 24d is another edge surface of the plate member that is on an opposite side from the light entrance surface 24a. The light exit surface 24b is a plate surface of the plate member and the light entering through the light entrance surface 24a exits the light guide plate 24 through the light exit surface. The light reflecting portion 34 is disposed on at least the opposite edge surface 24d and reflecting light travelling within the light guide plate 24 toward the opposite edge surface 24d.

16 Claims, 26 Drawing Sheets

(52) U.S. Cl.
CPC ......... *G02B 6/0076* (2013.01); *G02B 6/0088* (2013.01); *G02B 6/0061* (2013.01); *G02F 1/133308* (2013.01)

(56) References Cited

U.S. PATENT DOCUMENTS

| | | | |
|---|---|---|---|
| 2007/0052880 A1* | 3/2007 | Lv | G02B 6/0016 349/58 |
| 2007/0132909 A1 | 6/2007 | Oohira | |
| 2010/0020261 A1 | 1/2010 | Oohira | |
| 2013/0265503 A1* | 10/2013 | Hosoki | G02B 6/0068 348/790 |
| 2013/0289764 A1 | 10/2013 | Kwon et al. | |

FOREIGN PATENT DOCUMENTS

| | | | |
|---|---|---|---|
| JP | 3240703 B2 * | 12/2001 | |
| JP | 2007-163556 A | 6/2007 | |
| JP | 2013-229332 A | 11/2013 | |

\* cited by examiner

… (1)

LIGHTING DEVICE, DISPLAY DEVICE, AND METHOD OF MANUFACTURING LIGHTING DEVICE

TECHNICAL FIELD

The present invention relates to a lighting device, a display device, and a method of manufacturing a lighting device.

BACKGROUND ART

Liquid crystal panels have been widely used as display panels for displaying images in display devices of electronic devices such as handheld terminals (for example, smartphones and tablet computers). Such a display device includes the liquid crystal panel and a backlight device (a lighting device) that supplies light to the liquid crystal panel.

An example of the backlight device is described in Patent Document 1 and includes a light guide plate made of transparent plate member, and a light source (for example, LEDs) that is arranged opposite an edge surface of the light guide plate. Such a device is a backlight device of an edge light type (or a side light type). Light emitted by the light source of the backlight device enters the light guide plate through an edge surface of the light guide plate opposite the light source (hereinafter, a light entrance surface). The light travels within the light guide plate and exits the light guide plate through a front-side plate surface (hereinafter, a light exit surface) in a form of planar light. Such an edge light-type backlight device can be reduced in thickness compared to other type of backlight device (for example, a direct-type backlight device). Therefore, the edge light-type backlight devices are preferably used in display devices that highly require reduction in thickness, such as the handheld terminals.

In the configuration of Patent Document 1, the light guide plate is arranged inside a frame-shaped mold (a frame).

RELATED ART DOCUMENT

Patent Document

Patent Document 1: Japanese Unexamined Patent Application Publication No. 2007-163556

Problem to be Solved by the Invention

However, in the configuration of the edge light-type backlight device described in Patent Document 1, the light entering the light guide plate is likely to leak from the light guide plate through an edge surface of the light guide plate opposite from the light entrance surface (hereinafter, an opposite edge surface), and brightness of the lighting device may be deteriorated due to the leaking of light. In the configuration of Patent Document 1 including the frame, the light leaking through the opposite edge surface may reflect off the frame and may travel toward the light exit surface through a clearance between the light guide plate and the frame. Accordingly, an opposite edge surface-side portion of the light exit surface may be seen brighter than other portions. The lighting device may include a wide light blocking layer on the light exit surface-side to block the light leaking through the opposite edge surface such that the above problem is less likely to be caused. However, reduction of the frame width of the lighting device or the display device including the lighting device may be hindered according to the width dimension of the light blocking layer.

DISCLOSURE OF THE PRESENT INVENTION

The present invention was made in view of the foregoing circumstances. An object of the present invention is to restrict deterioration of brightness and contribute to reduction in frame width.

Means for Solving the Problem

A lighting device according to the present invention includes a light source, a light guide plate that is a plate member, and a light reflecting portion. The light guide plate includes a light entrance surface, an opposite edge surface, and a light exit surface. The light entrance surface is an edge surface of the plate member and opposite the light source and light emitted by the light source enters the light guide plate through the light entrance surface. The opposite edge surface is another edge surface of the plate member that is on an opposite side from the light entrance surface. The light exit surface is a plate surface of the plate member and the light entering through the light entrance surface exits the light guide plate through the light exit surface. The light reflecting portion is disposed on at least the opposite edge surface and reflects light travelling within the light guide plate toward the opposite edge surface.

According to such a configuration, the light reflecting portion is disposed closely on the opposite edge surface through which light is likely to leak among the edge surfaces of the light guide plate. Light reflects off the light reflecting portion to reduce the amount of light leaking through the opposite edge surface. Thus, brightness of the lighting device is less likely to be lowered. Further, the amount of light leaking through the opposite edge surface and travelling toward the light exit surface is reduced. Therefore, a width of the light blocking layer for blocking light travelling toward the light exit surface is reduced, and the frame width of the device is reduced.

In the above lighting device, the light guide plate may have at least a curved edge surface having a curved plan view shape, and the light reflecting portion may be formed on the curved edge surface.

According to such a configuration, the amount of light leaking through the opposite edge surface including the curved edge surfaces is reduced and the frame width of the lighting device is reduced effectively. Specifically, a clearance is provided between the light guide plate and the component that is mounted on the light guide plate with considering dimension errors and mounting tolerance. A clearance between the curved edge surfaces and the component is generally greater than a clearance between the component and other edge surfaces having planar straight linear shapes with considering deformation of a molded object. In the above configuration having the clearance, the amount of light leaking through the curved edge surfaces and travelling toward the light exit surface through the clearance is reduced by forming the light reflecting portion on the curved edge surfaces.

In the above lighting device, the light guide plate may have a through hole through a thickness of the light guide plate, and the lighting device may further include an inner peripheral surface light reflecting portion adhered on an inner peripheral edge surface of the through hole and reflecting light travelling within the light guide plate toward the through hole.

In the light guide plate having the through hole, a portion opposite from the light entrance surface with respect to the through hole is less likely to receive light travelling within the light guide plate because the through hole is between the light entrance surface and the portion. In the above configuration, the light reflecting off the light reflecting portion and the inner peripheral surface light reflecting portion exits the portion opposite from the light entrance surface. Therefore, brightness is less likely to be lowered in the portion.

The above lighting device may further include an other plate surface-side light reflecting portion on another plate surface of the plate member of the light guide plate for reflecting light travelling within the light guide plate toward the other plate surface in a direction toward the light exit surface, and the opposite edge surface may be an inclined surface inclined with respect to the other plate surface at an obtuse angle.

According to such a configuration, the other plate surface-side light reflecting portion and the light reflecting portion are collectively formed easily. In the light guide plate having the same plate thickness, the light guide plate of the above configuration has a greater area of the opposite edge surface compared to the area of the opposite edge surface that is right angle to the other plate surface. Therefore, a contact area between the light reflecting portion and the opposite edge surface is increased and the light reflecting portion is less likely to be removed from the edge surface.

The above lighting device may further include an other plate surface-side light reflecting portion on another plate surface of the plate member of the light guide plate for reflecting light travelling within the light guide plate toward the other plate surface in a direction toward the light exit surface, and the opposite edge surface may be a curved surface, and a tangent line to the curved surface and the other plate surface form an obtuse angle.

According to such a configuration, the other plate surface-side light reflecting portion and the light reflecting portion are collectively formed easily. In the light guide plate having the same plate thickness, the light guide plate of the above configuration has a greater area of the opposite edge surface compared to the area of the opposite edge surface that is right angle to the other plate surface. Therefore, a contact area between the light reflecting portion and the opposite edge surface is increased and the light reflecting portion is less likely to be removed from the edge surface.

In the above lighting device, the light reflecting portion may be formed on an edge portion of the light exit surface near the opposite edge surface, the opposite edge surface, and an edge portion of the other plate surface near the opposite edge surface side, and the light reflecting portion may be formed in a cross-sectional U shape.

Sink marks or damages on the light guide plate that may cause bright spot is generally likely to be caused on the edge portion of the light exit surface and the edge portion of the other plate surface. However, according to the above configuration, the sink marks or damages are covered with the light reflecting portion and the bright spot is less likely to be caused.

The above lighting device may further include a resin frame made of synthetic resin having light reflectivity and extending to face the edge surfaces of the light guide plate and surround at least the light source and the light guide plate.

In the configuration including the resin frame and without including the light reflecting portion, light leaking through the opposite edge surface reflects off the resin frame and enters the light guide plate through the edge surface again. However, a part of rays of light reflecting off the resin frame is likely to leak toward the light exit surface of the lighting device. In the above configuration, the light travelling toward the opposite edge surface reflects off the light reflecting portion to be effectively returned into the light guide plate. Further, the amount of light leaking through the clearance between the resin frame and the opposite edge surface toward the light exit surface is reduced.

The above lighting device may further include a metal frame made of metal having light reflectance lower than that of the light reflecting portion and receiving at least the light source and the light guide plate therein.

In such a configuration, if the metal frame is made of stainless steel, which is generally used and has low light reflectance, light leaking through the opposite edge surface and absorbed by the metal frame is reflected by the light reflecting portion and exits the light guide plate through the light exit surface. Thus, brightness of the lighting device is preferably improved.

The above lighting device may further include a surrounding member having light reflectivity and covering the light exit surface and the opposite edge surface and collectively surround at least the light source and the light guide plate to be mounted in each other.

In a configuration without including the light reflecting portion, the rays of light leak through the opposite edge surface and pass the surrounding member and leak outside. In the above configuration, the leaking light reflects off the light reflecting portion and exits through the light exit surface and brightness of the lighting device is effectively improved.

A display device according to the present invention includes the above lighting device, and a display panel displaying images using light from the lighting device. In the display device, the display panel may be a liquid crystal panel including a pair of substrates and liquid crystals enclosed between the substrates.

The display device may further include a casing member where the lighting device and the display panel are arranged and having a box shape including side walls that are opposite the edge surfaces of the light guide plate.

According to such a configuration, the light travelling toward the opposite edge surface is reflected by the light reflecting portion and therefore, the amount of light leaking through the gap between the opposite edge surface and the casing member such as casing or cover panel is reduced.

A method of manufacturing the lighting device according to the present invention includes a light reflecting portion forming process forming the light reflecting portion. In the light reflecting portion forming process, multiple light guide plates are arranged in a thickness direction thereof without having any space therebetween such that the opposite edge surface of each of the light guide plates is flush with each other, and a coating film containing particles having light reflectivity or a metal thin film having light reflectivity is formed on opposite edge surfaces of the light guide plates such that the light reflecting portion is formed collectively on the light guide plates. According to such a method, the light reflecting portion is formed effectively.

Further, the method of manufacturing the lighting device includes a light reflecting portion forming process forming the light reflecting portion. In the light reflecting portion forming process, the light reflecting portion and the other plate surface-side light reflecting portion are formed collectively with screen printing using a flexible screen. According to such a method, the light reflecting portion is formed effectively.

Further, the method of manufacturing the lighting device includes a light reflecting portion forming process forming the light reflecting portion. In the light reflecting portion forming process, a flexible pad member is pressed onto the opposite edge surface and the other plate surface and the light reflecting portion and the other plate surface-side light reflecting portion are formed collectively with pad printing. According to such a method, the light reflecting portion is formed effectively.

Further, the method of manufacturing the lighting device includes a light reflecting portion forming process forming the light reflecting portion. In light reflecting portion forming process, multiple light guide plates and protection plate members for protecting the plate surfaces of the light guide plate are arranged alternately in a thickness direction without having space therebetween such that edge surfaces of the protection plate members are recessed from the opposite edge surfaces of the light guide plates, and a coating film containing particles having light reflectivity or a metal thin film having light reflectivity is formed on opposite edge surface side edge portions of the light exit surfaces of the light guide plates, the opposite edge surfaces of the light guide plates, and opposite edge surface side edge portions of the other plate surfaces of the light guide plates and the light reflecting portion is formed collectively on the light guide plates. According to such a method, the light reflecting portion is formed effectively.

Advantageous Effect of the Invention

According to the present invention, brightness is less likely to be deteriorated and a frame width is reduced.

MODES FOR CARRYING OUT THE INVENTION

First Embodiment

Figure 1:
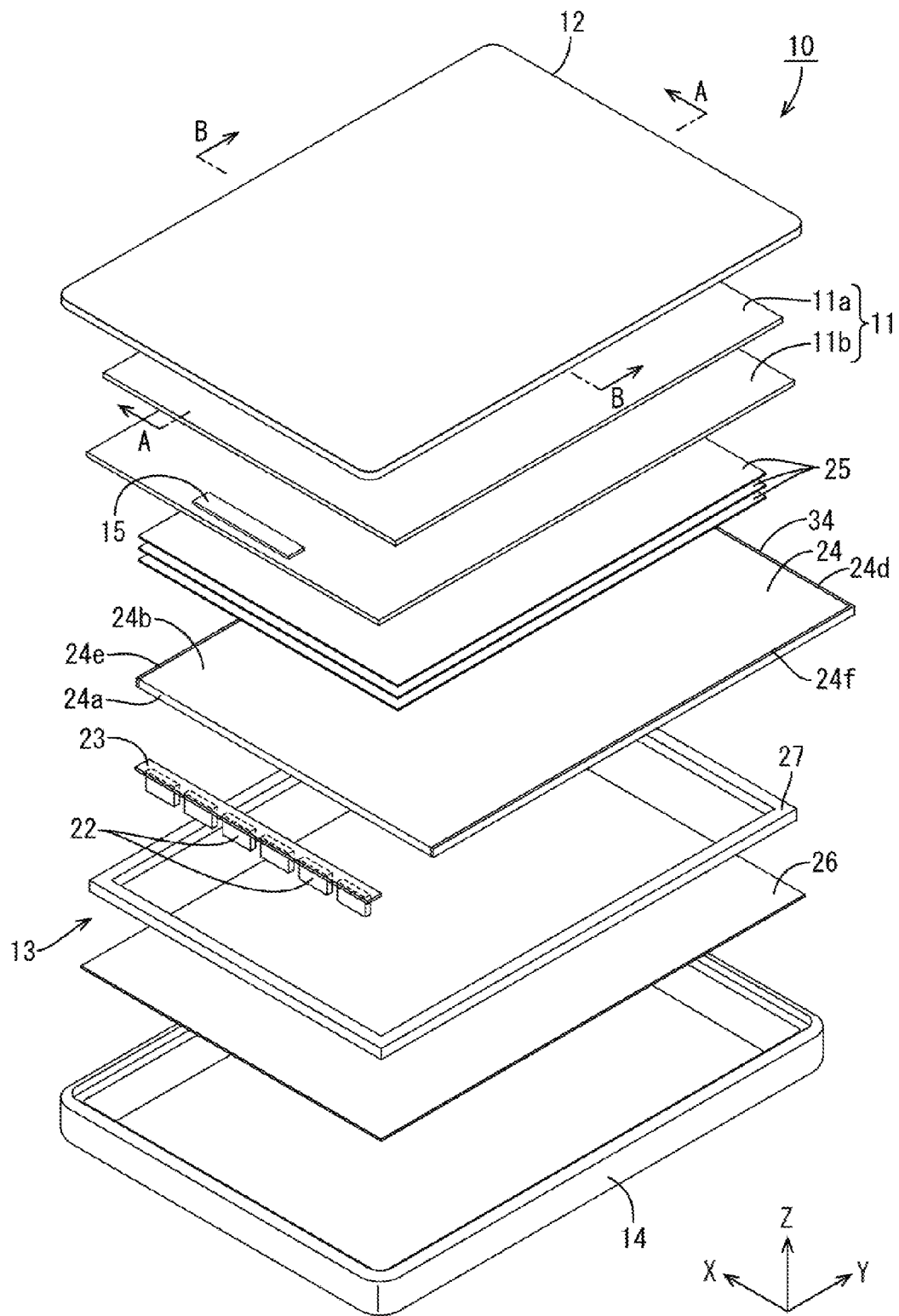
FIG. 1 is an exploded perspective view of a liquid crystal panel display device according to a first embodiment.

A first embodiment of the present invention will be described with reference to FIGS. 1 to 8. A backlight device 13 and a liquid crystal display device 10 including the backlight device will be described as an example. X-axis, the Y-axis and the Z-axis may be present in the drawings. An upper side and a lower side in FIG. 3 correspond to a front side and a back side of the backlight device 13, respectively.

Figure 2:
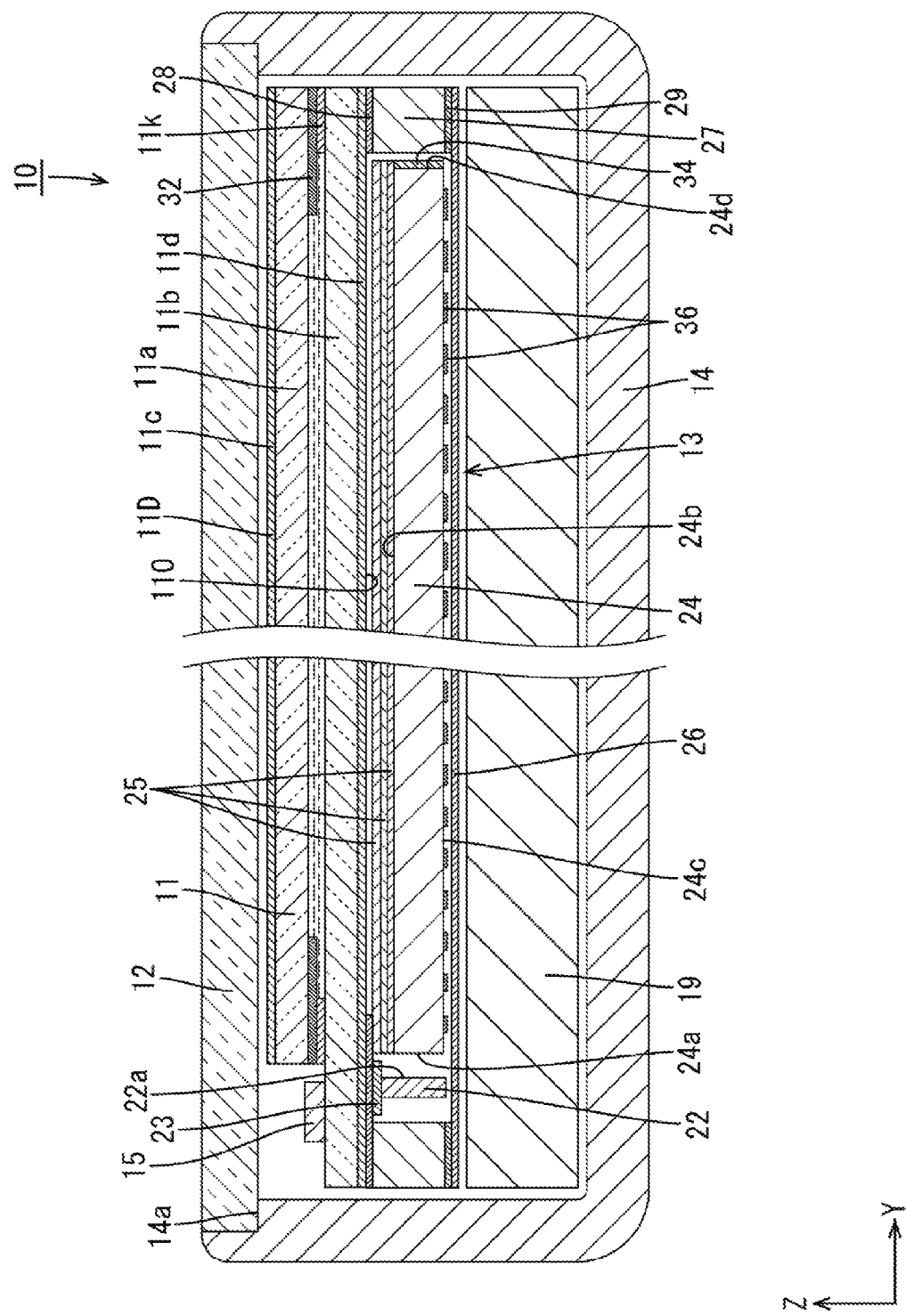
FIG. 2 is a cross-sectional view of the liquid crystal display device taken along a long side direction (taken along line A-A in FIG. 1).
Figure 3:
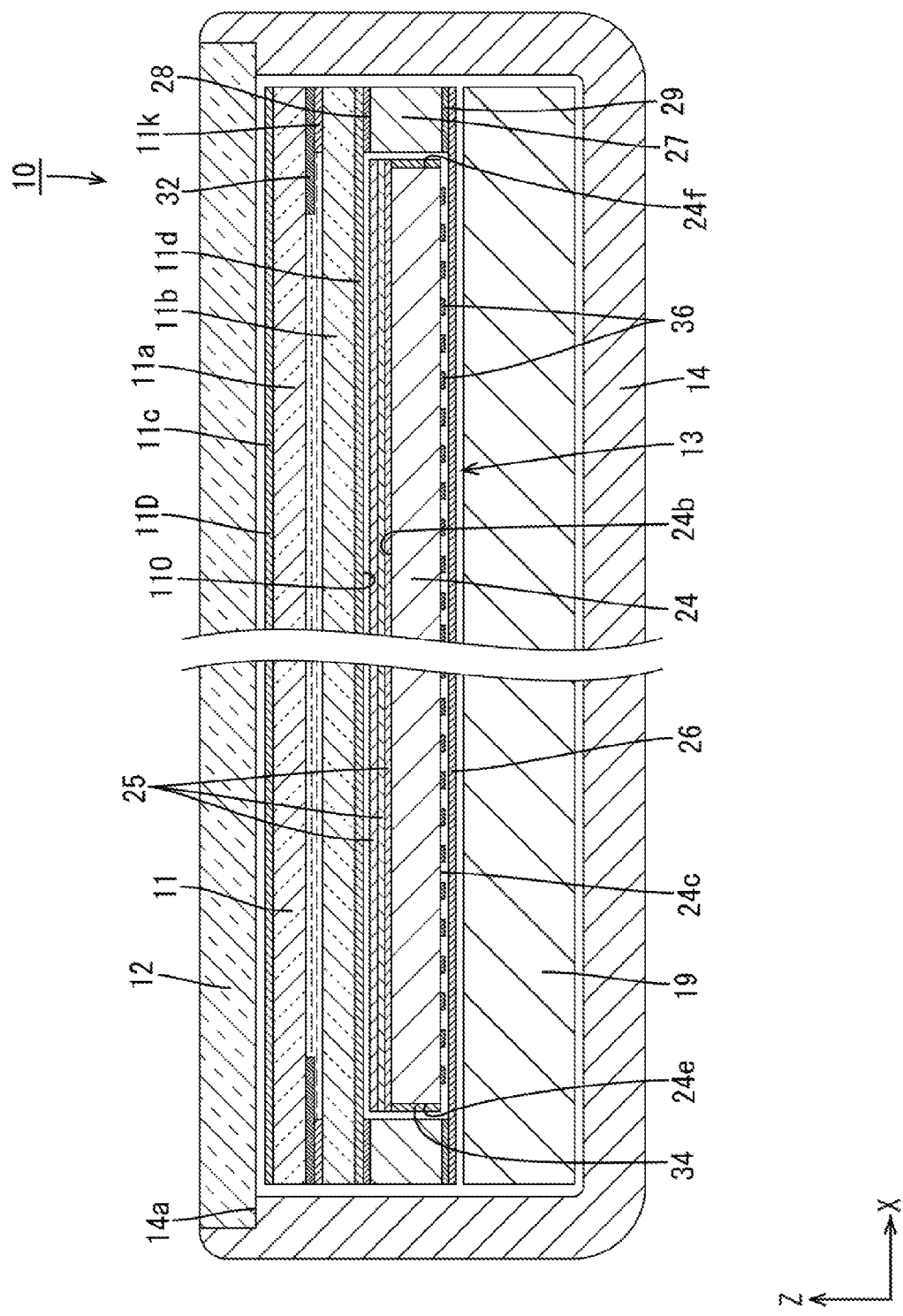
FIG. 3 is a cross-sectional view of the liquid crystal display device taken along a short side direction (taken along line B-B in FIG. 1).

FIG. 1 is an exploded perspective view of the liquid crystal panel display device 10 according to the first embodiment. As illustrated in FIG. 1, the liquid crystal display device 10 has a vertically-long quadrilateral (or rectangular) overall shape. The liquid crystal panel display device 10 includes a liquid crystal panel (a display panel) 11, a cover panel 12, and the backlight device (a lighting device) 13. The liquid crystal panel 11 has a front side plate surface that is a display surface 11D displaying images and a rear side plate surface that is an opposite surface 11O. The cover panel 12 is arranged to face the display surface 11D of the liquid crystal display panel 11. The backlight device 13 is arranged to face the opposite surface 110 of the liquid crystal panel 11 and supplies light to the liquid crystal panel 11. The liquid crystal display device 10 further includes a casing 14 where the cover panel 12, the liquid crystal panel 11, and the backlight device 13 are arranged. Within a space of the casing 14, boards (not illustrated) and a battery 19 are arranged on the rear side with respect to the backlight device 13 (see FIGS. 2 and 3). The boards include a control board for controlling driving of the liquid crystal panel 11, and a LED drive board for supplying driving power to LEDs 22. Among the components of the liquid crystal display device 10, the cover panel 12 and the casing 14 constitute an outer appearance of the liquid crystal display device 10. As illustrated in FIGS. 2 and 3, the casing 14 has a cover panel placing surface 14a that is formed by cutting away a part of an inner peripheral surface of an opening thereof. The cover panel 12 is fixed on the cover panel placing surface 14a via an adhesive layer, which is not illustrated, to cover the opening of the casing 14.

The liquid crystal display device 10 may be used in various kinds of electronic devices such as handheld terminals (such as mobile phones, smartphones, and tablet-type personal computers), vehicle-mounted terminals (such as built-in car navigation system, portable car navigation system), and portable video game players. The liquid crystal panel 11 and the cover panel 12 in the liquid crystal display device 10 are in a range between some inches to ten and some inches. Namely, the liquid crystal panel 11 and the cover panel 12 are in a size that is classified as a small or a small-to-medium. In this embodiment, dimensions of the components and spaces between the components are described with reference to a screen size of about five inches.

As illustrated in FIGS. 2 and 3, the liquid crystal panel 11 includes a pair of substrates 11a and 11b, and a liquid crystal layer 11e. The substrates 11a, 11b have a rectangular plan view shape and made of transparent glass (having high light transmissivity). The liquid crystal layer 11e is interposed between the substrates 11a and 11b, and includes liquid crystal molecules having optical characteristics that change according to application of the electric field. The substrates 11a and 11b are bonded by a sealing agent 11k while a gap corresponding to the thickness of the liquid crystal layer 11e is maintained. Each of the substrates 11a, 11b has a plate thickness of approximately 0.2 mm and the liquid crystal panel 11 is reduced in thickness. Polarizing plates 11c and 11d are attached to the outer surfaces of the substrates 11a and 11b.

Figure 4:
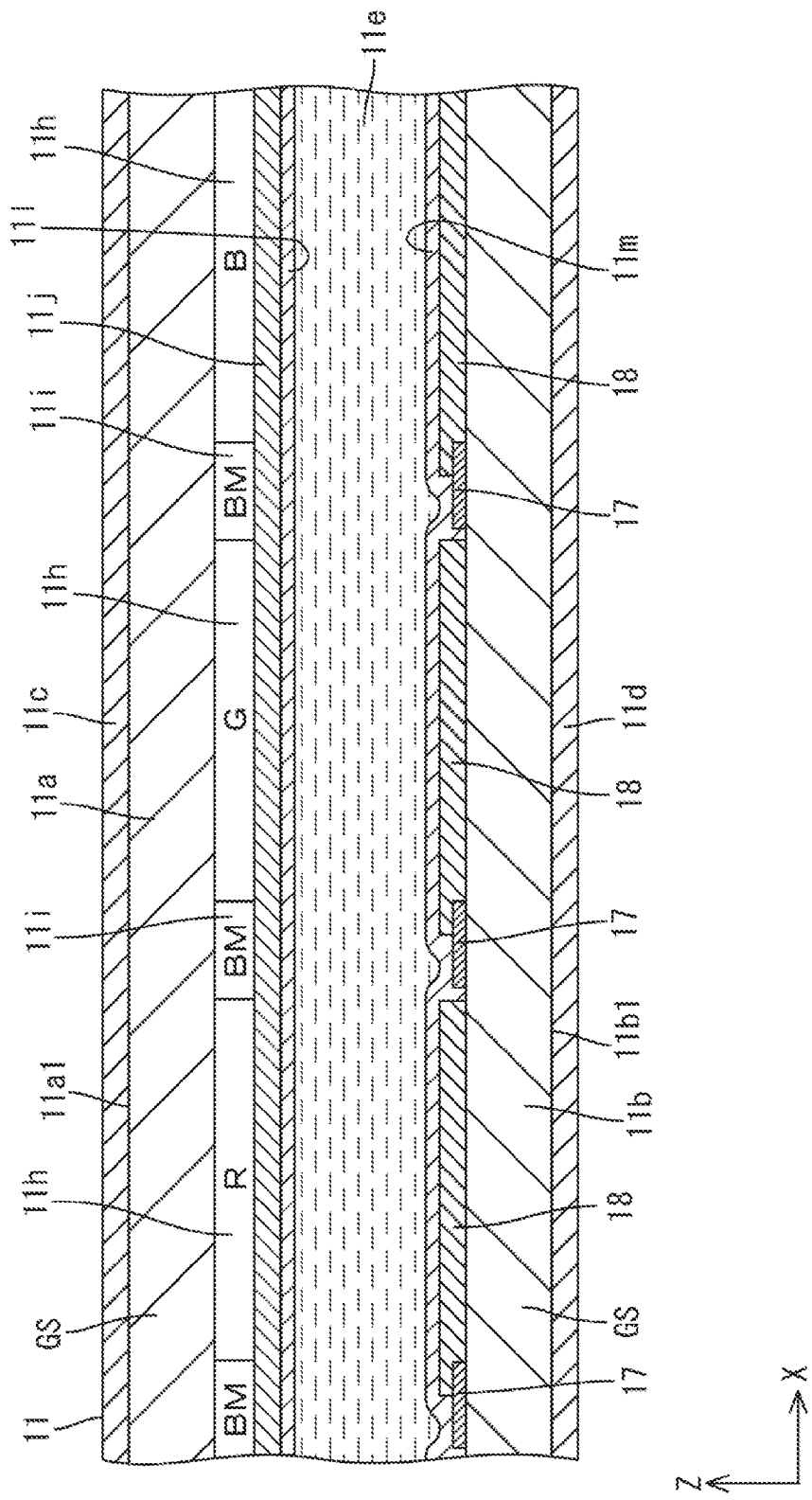
FIG. 4 is a cross-sectional view illustrating a cross-sectional configuration of a liquid crystal panel.

As illustrated in FIG. 4, in a display area of the array board 11b near a middle portion of the screen where images are displayed, a number of TFTs (thin film transistors) 17, which are switching components, and a number of pixel electrodes 18 are disposed in a matrix on an inner surface side (a liquid crystal layer 11e side, on a side opposite the CF board 11a) with respect to the array board 11b. Gate lines and source lines are routed in a matrix near the TFTs 17 and the pixel electrodes 18. The gate lines and the source lines receive signals from a driver 15 via end portions thereof that are connected to the driver 15 (see FIG. 1).

As illustrated in FIG. 4, on the inner surface side of the display area that is a middle screen area displaying images, the CF board 11a includes a color filter 11h including red (R), green (G), and blue (B) color portions arranged in a matrix so as to overlap the pixel electrodes 18 on the array board 11b side in a plan view. A black matrix 11i is formed in a grid for preventing colors from mixing. Each line of the grid is located between the adjacent color portions of the color filters 11h. The black matrix 11i is disposed to overlap the gate lines and the source lines in a plan view. An opposed electrode 11j that is solid to be opposite the pixel electrodes 18 on the array board 11b side is disposed on surfaces of the color filter 11h and the black matrix 11i. Each display pixel of the liquid crystal panel 11, which constitutes a display unit, includes a set of three color portions, that is, R (red), G (green) and B (blue) color portions and three pixel electrodes 18 opposite to the color portions. The display pixel includes a red pixel including the R color portion, a green pixel including the G color portion, and a blue pixel including the B color portion. The pixels are arranged on the plate surface of the liquid crystal panel 11 in repeated sequence along the row direction (the X-axis direction) and form groups of pixels. The groups of pixels are arranged in the column direction (the Y-axis direction). Alignment films 11l, 11m are disposed on the inner surface side of the boards 11a, 11b to align the liquid crystal molecules included in the liquid crystal layer.

Figure 5:
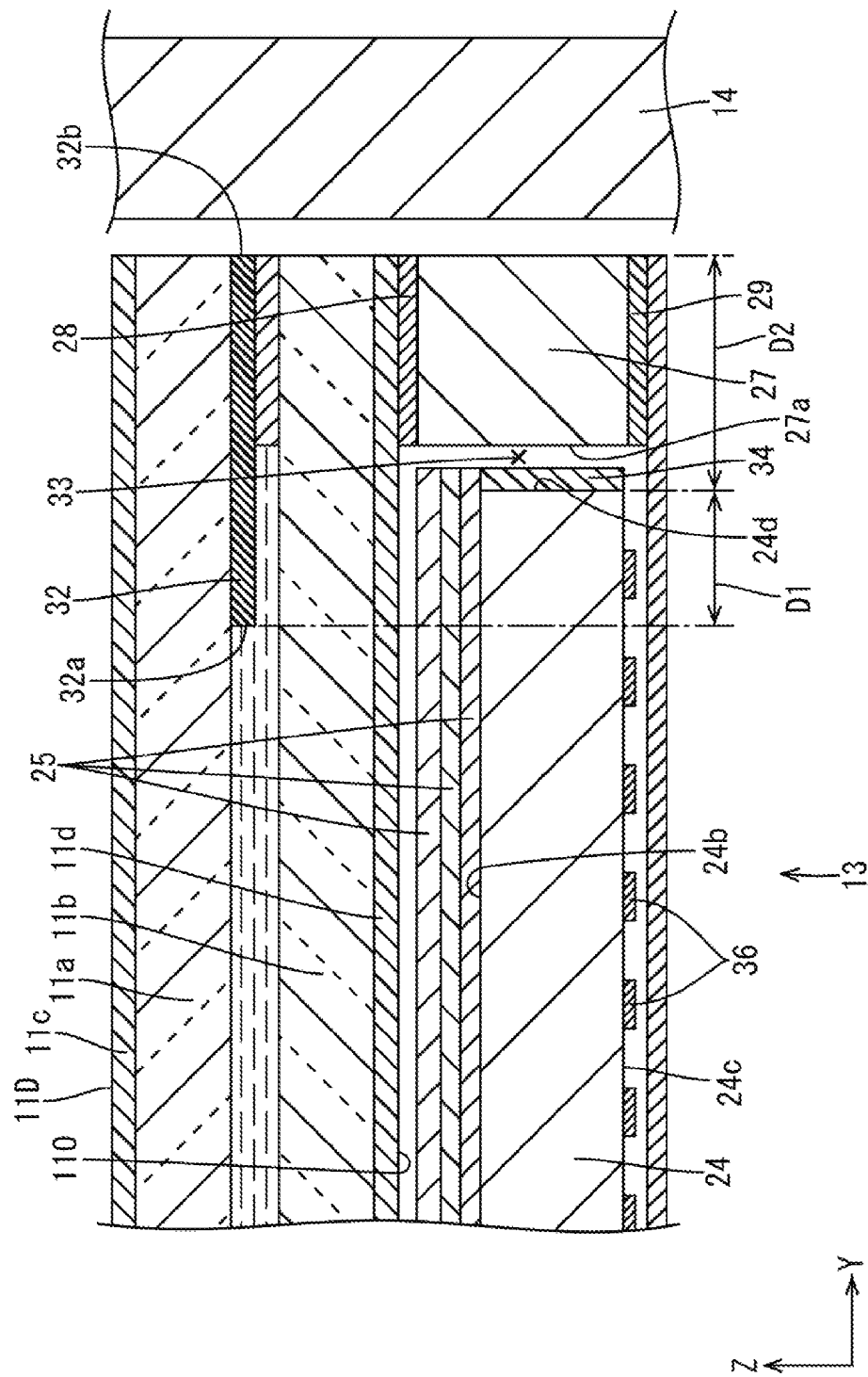
FIG. 5 is a cross-sectional view illustrating a part of the liquid crystal display device in FIG. 2.

As illustrated in FIG. 5, a light blocking layer 32 is formed on an inner surface side of the CF board 11a in a non-display area where no image is displayed. The non-display area is on an outer peripheral edge of the screen. The light blocking layer 32 is made of the same material as that of the black matrix 11i and formed at the same time as the black matrix 11i. In other words, the light blocking layer 32 is black and may be a light absorbing portion having light absorbing properties. The light blocking layer 32 is formed in an area extending along an outer peripheral edge portion of the CF board 11a in a frame shape. An area of the liquid crystal panel 11 surrounded by the light blocking layer 32 is a display area (an active area) displaying images that are seen by a user via the cover panel 12. A configuration of the light blocking layer 32 will be described later.

As illustrated in FIG. 1, the backlight device (the lighting device) 13 has a vertically-long quadrilateral (or rectangular) overall plan view shape similar to that of the liquid crystal panel 11. The backlight device 13 includes light emitting diodes (LEDs) 22 as a light source, a LED board (a light source board) 23 where the LEDs 22 are mounted, a light guide plate 24 guiding light from the LEDs 22, a light reflecting portion 34 formed to be closely in contact with the light guide plate 24, optical sheets (an optical member) 25 layered on an upper surface of the light guide plate 24, a light reflection sheet 26 layered on a lower surface of the light guide plate 24, and a frame (a panel support member) 27. The frame 27 surrounds the light guide plate 24 and the optical sheets 25 and supports the liquid crystal panel 11 from the rear side (an opposite side from the cover panel 12 side). The backlight device 13 is an edge light-type lighting device including the LEDs 22 locally in the outer peripheral edge portion of the liquid crystal panel 11. Hereinafter, the components of the backlight device 13 will be described.

As illustrated in FIG. 2, a base board is fixed on the plate surface of the LED board 23 and the LEDs (light source) 22 are configured by enclosing the LED chips with resin material on the base board. The LED chips mounted on the base board emit light having one main light emitting wavelength and specifically emit single blue light. Phosphors are dispersed in the resin material enclosing the LED chips and the phosphors are excited by blue light emitted by the LED chips and emit light of predetermined color and. The LED chips emit white light as a whole. The LEDs 22 are side-surface emitting type where side surfaces of the LEDs 22 are light emitting surfaces 22a. The side surfaces of the LEDs 22 are next to mounting surface that are mounted on the LED board 23.

Figure 6:
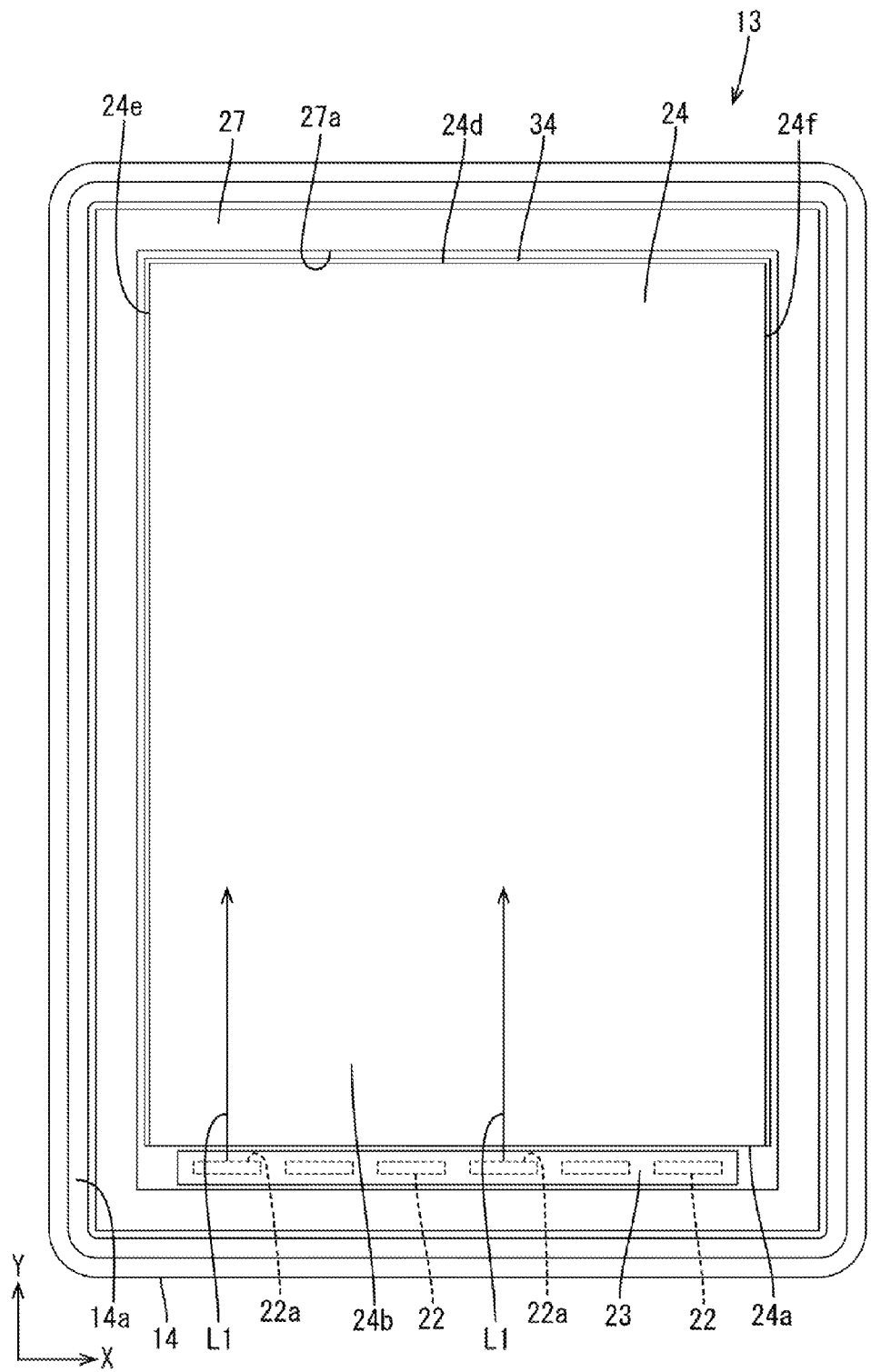
FIG. 6 is a plan view of a lighting device (an optical member is not illustrated).

As illustrated in FIG. 6, the LEDs 22 emits light through the light emitting surface 22a and the light has a certain spread area (directivity) around an optical axis L1. In this embodiment, the optical axis L1 of the exit light is substantially vertical to a middle portion of the light emitting surface 22a. Therefore, among the rays of light emitted by the LEDs 22 and traveling toward edge surfaces 24d, 24e, 24f of the light guide plate 24, an amount of rays of light travelling toward the edge surface 24d is greater than an amount of rays of light travelling toward the edge surfaces 24e, 24f.

As illustrated in FIG. 2, the LED board 23 includes a base board made of an insulating flexible film (sheet), the LEDs 22 mounted on the surface of the base board, and a trace pattern formed on the base board for supplying power to the LEDs 22. The LED board 23 is disposed on only one short-side edge portion of the backlight device 13 and extends in a short-side direction (the Y-axis direction) of the backlight device 13. The LEDs 22 are arranged on the LED board 23 at intervals along an elongated direction of the LED board 23. The LED board 23 is sandwiched between the liquid crystal panel 11 and the frame 27, which will be described layer, with respect to a thickness direction (the Z-axis direction) of the backlight device 13. Therefore, the LED 22 mounting surface of the LED board 23 faces the rear side (an opposite side from the liquid crystal panel 11 side).

As illustrated in FIG. 1, the light guide plate 24 has a quadrilateral plan-view shape and is a vertically elongated plate member having a plate surface that is parallel to a plate surface of the liquid crystal panel 11. Specifically, the light guide plate 24 is formed of a thin plate member having a thickness of 6 mm or less and has quadrilateral edge surfaces 24a, 24d, 24e, 24f that extend from plate surfaces 24b, 24c at an angle of substantially 90 degrees. The light guide plate 24 is made of transparent synthetic resin such as acrylic resin or polycarbonate. Among four outer peripheral edge surfaces of the light guide plate 24, a short-side edge surface 24a illustrated on a left side in FIG. 2 is opposite the LEDs 22 and is a light entrance surface (a light source opposing edge surface) 24a. Namely, the edge surface 24a is irradiated with light emitted by the LEDs 22 and the light enters the light guide plate 24 through the edge surface 24a. In this embodiment, only one of the four outer peripheral edge surfaces is the light entrance surface 24a. As illustrated in FIG. 2, the other one 24d of the short-side edge surfaces on the opposite side from the light entrance surface 24a is opposite an inner peripheral surface 27a of the frame 27, which will be described later, and is referred to as an opposite edge surface 24d in this specification. The opposite edge surface 24d may be a light source non-opposing edge surface that is not opposite the LEDs 22. Among two long-side edge surfaces of the light guide plate 24, one of the edge surfaces on the left side in FIG. 3 is an edge surface 24e and the other one on the right side in FIG. 3 is an edge surface 24f. The edge surfaces 24e, 24f are also the light source non-opposing edge surfaces similar to the opposite edge surface 24d. The light reflecting portion 34 is formed on each of the opposite edge surface 24d, the edge surface 24e, and the edge surface 24f. A configuration of the light reflecting portion 34 will be described later.

As illustrated in FIGS. 2 and 3, a front-side plate surface (one plate surface) 24b of the light guide plate 24 is a light exit surface 24b through which light exits toward the liquid crystal panel 11. Planar light exits the light guide plate 24 through the light exit surface 24b toward the liquid crystal panel 11. The light guide plate 24 has a rear-side plate surface (other plate surface) 24c that is on an opposite side from the light exit surface 24b. The light guide plate 24 includes other plate surface-side light reflecting portion 34 adhered on the plate surface 24c. The light travelling within the light guide plate 24 toward the plate surface 24c reflects off the other plate surface-side light reflecting portion 34 in a direction toward the light exit surface 24b. The other plate surface-side light reflecting portion 34 is formed in a white dot pattern and reflects light with scattering. Therefore, the rays of light reflected and scattered by the other plate surface-side light reflecting portion 34 in a direction toward the light exit surface 24b include rays of light having an incident angle on the light exit surface 24b being smaller than a critical angle (does not cause total reflection). Therefore, light exits the light guide plate through the light exit surface 24b. The dot pattern of the other plate surface-side light reflecting portion 34 may be varied to control a light exit direction from the light guide plate 24. Specifically, an area occupied by the dots of the other plate surface-side light reflecting portion 34 in an unit area is increased as is farther away from the LEDs 22, the light exit amount is controlled as follows. In a portion of the light guide plate 24 near the LEDs 22 where the light amount within the light guide plate 24 is relatively great, the light exit amount is controlled to be less. In a portion of the light guide plate 24 far away from the LEDs 22 where the light amount within the light guide plate 24 is relatively small, the light exit amount is controlled to be more. Accordingly, a distribution of the light exit amount through the light exit surface 24b is less likely to be uneven. Further, the rear-side plate surface 24c of the light guide plate is covered with a light reflecting sheet 26.

As illustrated in FIGS. 2 and 3, the optical sheets 25 are layered on the light exit surface 24b of the light guide plate 24 and disposed between the liquid crystal panel 11 and the light guide plate 24. With such a configuration, the optical sheets 25 pass light from the light guide plate 24 therethrough while adding a specific optical property to the light, and direct the light toward the liquid crystal panel 11. The optical sheets 25 include multiple sheet-like members of a lens sheet, a diffuser sheet, and a reflection-type polarizing sheet.

As illustrated in FIGS. 2 and 3, the rear-side plate surface 24c of the light guide plate 24 is covered with the light reflecting sheet 26. The light reflecting sheet 26 is made of a sheet having good light reflecting property. The light travelling within the light guide plate 24 reflects off the light reflecting sheet 26 in a direction toward the front side (the light exit surface 24b). In other words, the light reflecting sheet 26 complements the function of the other plate surface-side light reflecting portion 34. The light reflecting sheet 26 has a rectangular outer plan view shape that is substantially same as the outer shape of the frame 27. The light reflecting sheet 26 is arranged to cover a clearance 33 between the light guide plate 24 and the frame 27 from the rear side.

As illustrated in FIG. 1, the frame (a resin frame) 27 has a vertically-long rectangular frame shape and has an outer shape that is substantially same as a plan-view outer size of the liquid crystal panel 11. As illustrated in FIGS. 2 and 3, the liquid crystal panel 11 is placed on the frame 27 and the outer peripheral edge portion of the liquid crystal panel 11 (a portion having the light blocking layer 32) is placed on an upper surface of the frame 27 via a panel adhesive tape 28 therebetween. The frame 27 supports the liquid crystal panel 11 over an entire periphery thereof from the rear side. The LEDs 22, the light guide plate 24, and the optical sheets 25 are arranged inside the frame 27 and the light reflecting sheet 26 is adhered on a lower surface of the frame 27 via a light reflecting sheet adhesive tape 29. With such a configuration, the frame 27 fixes the components of the backlight device 13 with each other.

The frame 27 is made of synthetic resin having light reflectivity. As illustrated in FIGS. 2 and 3, the frame 27 extends to face the edge surfaces 24a, 24d, 24e, 24f of the light guide plate 24 and surround at least the LEDs 22 and the light guide plate 24. The frame 27 is configured such that the light leaking from the light guide plate 24 reflects off an inner peripheral surface 27a of the frame 27 and enters the light guide plate 24 through the opposite edge surface 24d. The frame 27 is formed with injection molding and has a frame width of approximately 0.5 mm that is a minimum value of the frame width that can be processed with injection molding. The frame 27 has an inner peripheral size such that the clearance 33 of approximately ±0.15 mm is provided between the frame 27 and the light guide plate 24 after the light guide plate 24 is mounted in the frame 27. Such a clearance 33 is provided with considering the dimensional tolerance of the light guide plate 24 (approximately ±0.1%) and thermal expansion of each material due to temperature change.

Next, a configuration of the light reflecting portion 34 and a configuration of the light blocking layer 32 will be described.

As illustrated in FIG. 5, the light reflecting portion 34 is formed to be closely adhered on at least the opposite edge surface 24d and configured to reflect off the light traveling within the light guide plate 24 and travel toward the opposite edge surface 24d. The light reflecting portion 34 is formed over an entire area of the opposite edge surface 24d in a solid state. As illustrated in FIG. 6, in this embodiment, the light reflecting portion 34 is formed on the opposite edge surface 24d, the edge surface 24e and the edge surface 24f of the light guide plate 24. Namely, the light reflecting portion 34 is not formed on the light entrance surface 24a that is the light source opposing edge surface and is formed on the opposite edge surface 24d, the edge surface 24e, and the edge surface 24f that are the light source non-opposing edge surfaces. According to such a configuration, the amount of light leaking through the opposite edge surface 24d and the amount of light leaking through the edge surface 24e and the edge surface 24f are reduced. Accordingly, the amount of light leaking from the light guide plate 24 is further reduced. In FIG. 6, the backlight device 13 is illustrated without describing the optical sheets 25.

The light reflecting portion 34 is a white coating film and has good light reflectivity. The coating film is made by coating directly the opposite edge surface 24d, the edge surface 243, and the edge surface 24f with white ink that is coating material containing light reflective particles. The light reflecting portion 34 is configured to reflect with dispersing the light traveling within the light guide plate 24 toward the edge surfaces 24d, 24e, 24f in a direction toward the inside of the light guide plate 24. The light reflecting portion 34 has a thickness of approximately 5 μm to 50 μm according to light reflectance of the coating material. The light reflecting portion 34 has light reflectance that is substantially equal to or higher than that of the other plate surface-side light reflecting portion 34. If the light reflecting portion 34 and the other plate surface-side light reflecting portion 34 are made of same coating material, the light reflecting portion 34 has a thickness equal to or greater than that of the other plate surface-side light reflecting portion 34 or the light reflecting portion 34 has an area per a certain unit area that is equal to or greater than that of the other plate surface-side light reflecting portion 34. Accordingly, the light reflectance of the light reflecting portion 34 is appropriately determined. The light reflectance of the light reflecting portion 34 is preferably set to be equal to or higher than that of the frame 27. In each drawing, the light reflecting portion 34 and the other plate surface-side light reflecting portion 34 are described with greater thickness size than actual size to be clearly illustrated.

As illustrated in FIG. 5, the sealing agent 11k is covered with the light blocking layer 32 from the front surface side and the light blocking layer 32 blocks light reflecting off the light reflecting portion 34 and travelling toward the display surface 11D. The light blocking layer 32 is formed such that an inner edge 32a thereof is on an inner position from each of the opposite edge surface 24d, and the edge surfaces 24e, 24f by approximately 0.3 mm (D1≈0.3 mm). The light blocking layer 32 has an outer edge 32B that overlaps the frame 27 (overlaps an outer peripheral edge of the frame 27 in this embodiment) on an upper side. The light blocking layer 32 covers the clearance 33 between the frame 27 and the opposite edge surface 24d (the light reflecting potion 34). Accordingly, the light blocking layer 32 blocks light that travels toward the display surface side through the clearance 33. The edge portion of the light exit surface 24b near the opposite edge surface 24d is covered with the light blocking layer 32. Accordingly, a part of rays of light that is dispersed and reflected by the light reflecting portion 34 exits the light guide plate 24 directly through the edge portion of the light guide plate 24. The light directly exiting the light guide plate 24 is blocked by the light blocking layer 32. According to such a configuration, it is less likely to occur that the outer peripheral edge portion of the backlight device 13 is bright when the liquid crystal display device 10 is seen from the front surface.

The backlight device 13 has a backlight frame that extends from each of the edge surfaces of the light guide plate 24 to an outer peripheral edge of the backlight device 13. In the present embodiment, as illustrated in FIG. 5, the dimension of the backlight frame from the light source non-opposing edge surfaces 24d, 24e, 24f to the outer peripheral edge of the frame 27 is approximately 0.8 mm (D2≈0.8 mm). The side wall portions of the casing 14 have a thickness of approximately 1.5 mm. The frame width of the liquid crystal display device 10 is approximately 2.4 mm if the backlight device 13 is mounted in the casing 14 with the tolerance of 0.1 mm.

In the liquid crystal display device 10 including the above structured liquid crystal display device 10, if the LED (light source) 22 is driven, the light is emitted by the LED 22 through the light emission surface and enters the light guide plate 24 through the light entrance surface 24a. The light entering the light guide plate 24 travels within the light guide plate 24 toward the opposite edge surface 24d with repeating reflection between the front side plate surface 24b and the rear-side plate surface 24c. Most of the rays of light entering the light guide plate 24 through the light entrance surface 24a exits the light guide plate 24 through the light exit surface 24b until reaching the opposite edge surface 24d. A part of the rays of light entering the light guide plate 24 travels toward the opposite edge surface 24d. Most of the light travelling within the light guide plate 24 toward the opposite edge surface 24d reflects off the light reflecting portion 34 and travels within the light guide plate 24 again with repeating the reflection between the front sideplate surface 24b and the rear-side plate surface 24c. Then, the light exits the light guide plate 24 through the light exit surface 24b. A part of the rays of light reflecting off the light reflecting portion 34 exits the light guide plate 24 through the edge portion of the light exit surface 24*b* near the opposite edge surface 24*d* and absorbed by the light blocking layer 32. Some of the rays of light traveling within the light guide plate 24 and reaching the opposite edge surface 24*d* passes through the light reflecting portion 34 and travel toward an inner peripheral surface 27*a* of the frame 27. Such light may reflect off the inner peripheral surface 27*a* of the frame 27 and return back into the light guide plate 24 or travel toward the front surface side through the clearance 33 and may be absorbed by the light blocking layer 32. In a comparative example, the backlight device 13 without including the light reflecting portion 34 has the display brightness of approximately 500 cd/m$^2$. In the backlight device 13 of the present embodiment, the display brightness is approximately 550 cd/m$^2$ and the display brightness is improved compared to that in the backlight device without including the light reflecting portion 34.

Figure 7:
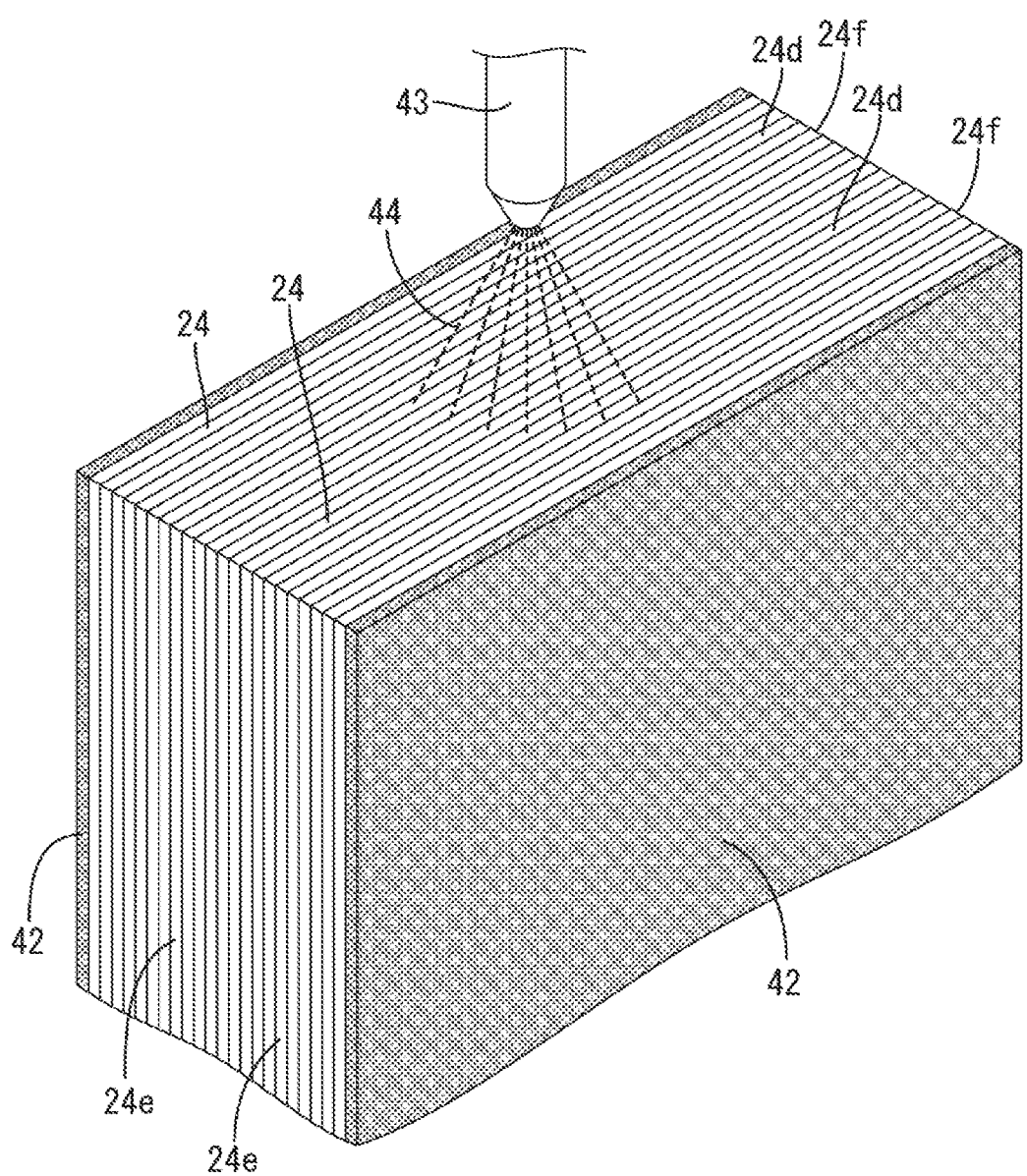
FIG. 7 is a perspective view illustrating a light reflection portion forming process where a light reflection portion is formed.

Next, a method of manufacturing the backlight device 13 will be described with reference to FIGS. 7 and 8. The method of manufacturing the backlight device 13 includes a light reflecting portion forming process where the light reflecting portion 34 is formed on the opposite edge surface 24*d*, the edge surface 24, and the edge surface 24*f*. The light reflecting portion forming process may be executed before or after forming the other plate surface-side light reflecting portion 34 on the rear plate surface 24*c* of the light guide plate 24.

In the light reflecting portion forming process, the light guide plates 24 are arranged in a thickness direction thereof without having a space therebetween and the opposite edge surfaces 24*d*, the edge surfaces 24*e*, and the edge surfaces 24*f* are flush with each other, respectively. A protection plate member 42 is put on each of the outer plate surfaces 24*b* and 24*c* of the outermost ones of the light guide plates 24 without having a space therebetween. The protection plate members 42 protect the plate surfaces 24*b*, 24*c*, respectively. Each of the protection plate members 42 has a plate surface having a same shape and a same size as the outer plate surface 24*b*, 24*c* of the light guide plate 24. The plate surfaces of the protection plate members 42 are overlapped with the plate surfaces 24*b*, 24*c* of the light guide plate 24 and the edge surfaces of the protection plate members 42 are flush with the edge surfaces 24*a*, 24*d*, 24*e*, 24*f* of the light guide plate, respectively.

The opposite edge surfaces 24*d* of the light guide plates 24 that are arranged in parallel to each other are coated with coating material 44 containing particles having light reflectivity with spray coating. Specifically, the light guide plates 24 are arranged such that the opposite edge surfaces 24*d* horizontally extend, and the coating material 44 is ejected with sprayed from a nozzle 43 of a spray device over an entire area of the opposite edge surfaces 24*d* that are continuous on a same plane. Similarly, the coating material 44 containing particles having the light reflectivity is coated on the edge surfaces 24*e* and the edge surfaces 24*f*. After the coating material 33 is dried, a coating film 46 is formed collectively on the light guide plates 24. A spray coating method is easy as a method of coating the coating material. However, it is not limited thereto and the methods of coating the coating material may include dispenser, screen printing, pad printing, gravure printing, ink jet printing, brush painting, or roller painting.

Figure 8:
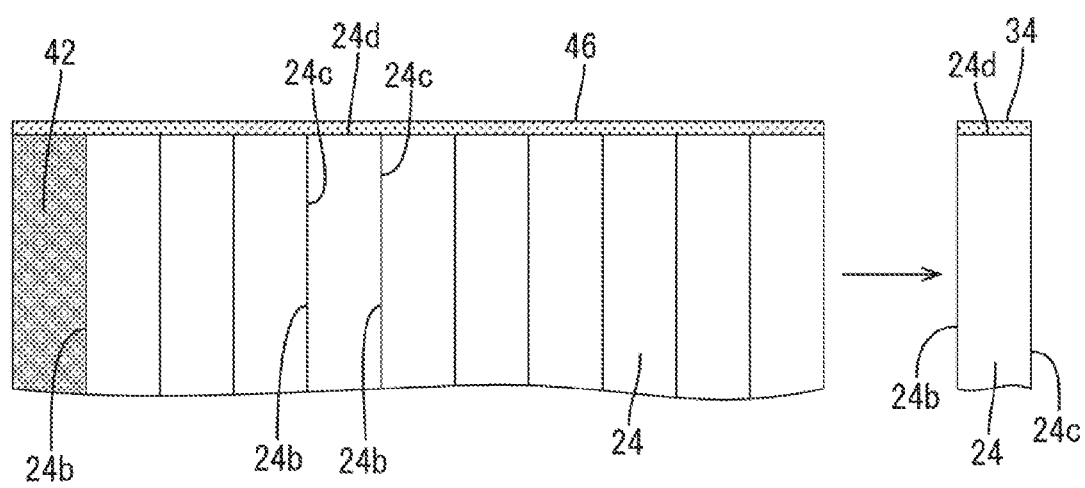
FIG. 8 is a view illustrating that the light reflection portion is formed in the process of FIG. 7.

After the coating material 44 is dried, the light guide plates 24 are separated from each other so that the coating film 46 that is formed collectively on the light guide plates 24 is divided for each light guide plate 24 (see FIG. 8). The coating film 46 is thin and is closely adhered on the edge surfaces 24*d*, 24*e*, 24*f* of the light guide plate 24. Therefore, the coating film 46 is divided with each of the light guide plates 24. Then, each of the light guide plates 24 includes the light reflecting portion 34. Thus, the light reflecting portion forming process is finished.

According to such a method, the light reflecting portion 34 having a constant film thickness is easily formed on the light guide plates 24 each having a small thickness. Further, the light reflecting portion 34 is less likely to be formed on the light exit portion 24*b* or the rear plate surface 24*c* of the light guide plate 24 unintentionally.

Operations and effects of the backlight device 13 of the present embodiment will be described.

The backlight device 13 of the present embodiment includes the LEDs 22, the light guide plate 24, and the light reflecting portion 34. The light guide plate 24 is a plate member and includes the light entrance surface 24*a* that is the edge surface 24*a* of the plate member and through which light emitted by the LEDs 22 enters the light guide plate 24. The light guide plate 24 further includes the opposite edge surface 24*d* that is the edge surface 24*d* of the plate member and opposite from the light entrance surface 24*a*, and the light exit surface 24*b* that is one plate surface 24*b* and through which the light entering through the light entrance surface 24*a* exits. The light reflecting portion 34 is disposed closely on at least the opposite edge surface 24*d* and the light traveling within the light guide plate 24 and directed toward the opposite edge surface 24 reflects off the light reflecting portion 34.

According to such a configuration, the light reflecting portion 34 is disposed closely on the opposite edge surface 24*d* through which light is likely to leak among the edge surfaces 24*a*, 24*d*, 24*e*, 24*f* of the light guide plate 24. Light reflects off the light reflecting portion 34 to reduce the amount of light leaking through the opposite edge surface 24*d*. Thus, brightness of the backlight device 13 is less likely to be lowered. Further, the amount of light leaking through the opposite edge surface 24*d* and travelling toward the light exit surface 24*b* is reduced. Therefore, a width of the light blocking layer 32 for blocking light travelling toward the light exit surface 24*b* is reduced, and the frame width of the device is reduced.

In the present embodiment, the backlight device 13 includes the frame 27 that is made of synthetic resin having light reflectivity and extends to surround at least the LEDs 22 and the light guide plate 24 to be opposite the edge surfaces 24*a*, 24*d*, 24*e*, 24*f* of the light guide plate 24.

In the configuration including the frame 27 and without including the light reflecting portion 34, light leaking through the opposite edge surface 24*d* reflects off the frame 27 and enters the light guide plate 24 through the edge surface again. However, a part of rays of light reflecting off the frame 27 is likely to leak toward the light exit surface 24*b* of the backlight device 13. In the configuration of the present embodiment, the light travelling toward the opposite edge surface 24*d* reflects off the light reflecting portion 34 to be effectively returned into the light guide plate 24. Further, the amount of light leaking through the clearance 33 between the frame 27 and the opposite edge surface 24*d* toward the light exit surface 24*b* is reduced.

First Modification of First Embodiment

Next, a first modification of the first embodiment will be described. The liquid crystal display device 10 of the first modification differs from that of the first embodiment in a configuration of the light reflecting portion 34 and a method of forming the light reflecting portion 34. Other configuration and the method are similar to those of the first embodiment and the configuration, the operation, and the effects thereof will not be described.

The light reflecting portion 34 is made of a metal thin film having good light reflectivity such as aluminum, silver, and titanium oxide. A film of the light reflecting portion 34 is directly formed on the opposite edge surface 24d, the edge surface 24e, and the edge surface 24f. The light traveling within the light guide plate 24 toward the edge surfaces 24d, 24e, 24f is reflected by the light reflecting portion 34 with being dispersed and travels toward the inside of the light guide plate 24. The light reflecting portion 34 has a thickness of 1 μm or less according to light reflectance of the thin film. The light reflecting portion 34 has light reflectance that is same or higher than that of the other plate surface-side light reflecting portion 34 on the rear plate surface 24c of the light guide plate 24. The light reflectance of the light reflecting portion 34 is preferably same or higher than that of the frame 27.

In the first modification of the first embodiment, an aluminum thin film, a silver thin film, or a titanium oxide film is formed on the opposite edge surfaces 24d of the light guide plates 24 that are arranged parallel to each other with evaporation or sputtering. Similarly, an aluminum thin film, a silver thin film, or a titanium oxide film is formed on the edge surfaces 24e and the edge surfaces 24f with evaporation or sputtering.

After the film is formed, the light guide plates 24 are separated from each other and a metal thin film 46 that is collectively formed is divided for each light guide plate 24 (see FIG. 8). The metal thin film 46 is thin and is closely adhered on the edge surfaces 24d, 24e, 24f of the light guide plate 24. Therefore, the metal thin film 46 is divided with each of the light guide plates 24. Then, each of the light guide plates 24 includes the light reflecting portion 34.

Second Modification of First Embodiment

Next, a second modification of the first embodiment will be described. The liquid crystal display device 10 of the second modification differs from that of the first embodiment and that of the first modification of the first embodiment in a configuration of the light reflecting portion 34 and a method of forming the light reflecting portion 34. Other configuration and the method are similar to those of the first embodiment and the configuration, the operation, and the effects thereof will not be described.

The light reflecting portion 34 is made of synthetic resin having good light reflectivity (for example, white synthetic resin) or a film having a white surface or a mirror surface. A film of the light reflecting portion 34 is layered on the opposite edge surface 24d, the edge surface 24e, and the edge surface 24f. The light traveling within the light guide plate 24 toward the edge surfaces 24d, 24e, 24f is reflected by the light reflecting portion 34 and travels toward the inside of the light guide plate 24. The light reflecting portion 34 has light reflectance that is same or higher than that of the other plate surface-side light reflecting portion 34 on the rear plate surface 24c of the light guide plate 24. The light reflectance of the light reflecting portion 34 is preferably same or higher than that of the frame 27.

In the second modification of the first embodiment, the light reflecting portion 34 is formed with insert molding or double molding in the light reflecting portion forming process. Specifically, the light guide plate 24 that is formed with injection molding is put in the die again and the light reflecting portion 34 is layered on the opposite edge surface 24d, the edge surface 24e, and the edge surface 24f. The light reflecting portion 34 may be formed first and the light guide plate 24 may be formed thereafter. The light reflecting portion 34 that is made of film may be formed with film insert molding. With such methods, the light reflecting portion 34 may be formed effectively by selecting the molding device and the die for molding the light guide plate 34. A cost for the light reflecting portion forming process is reduced compared to that in the first embodiment and the first modification of the first embodiment.

Second Embodiment

Figure 9:
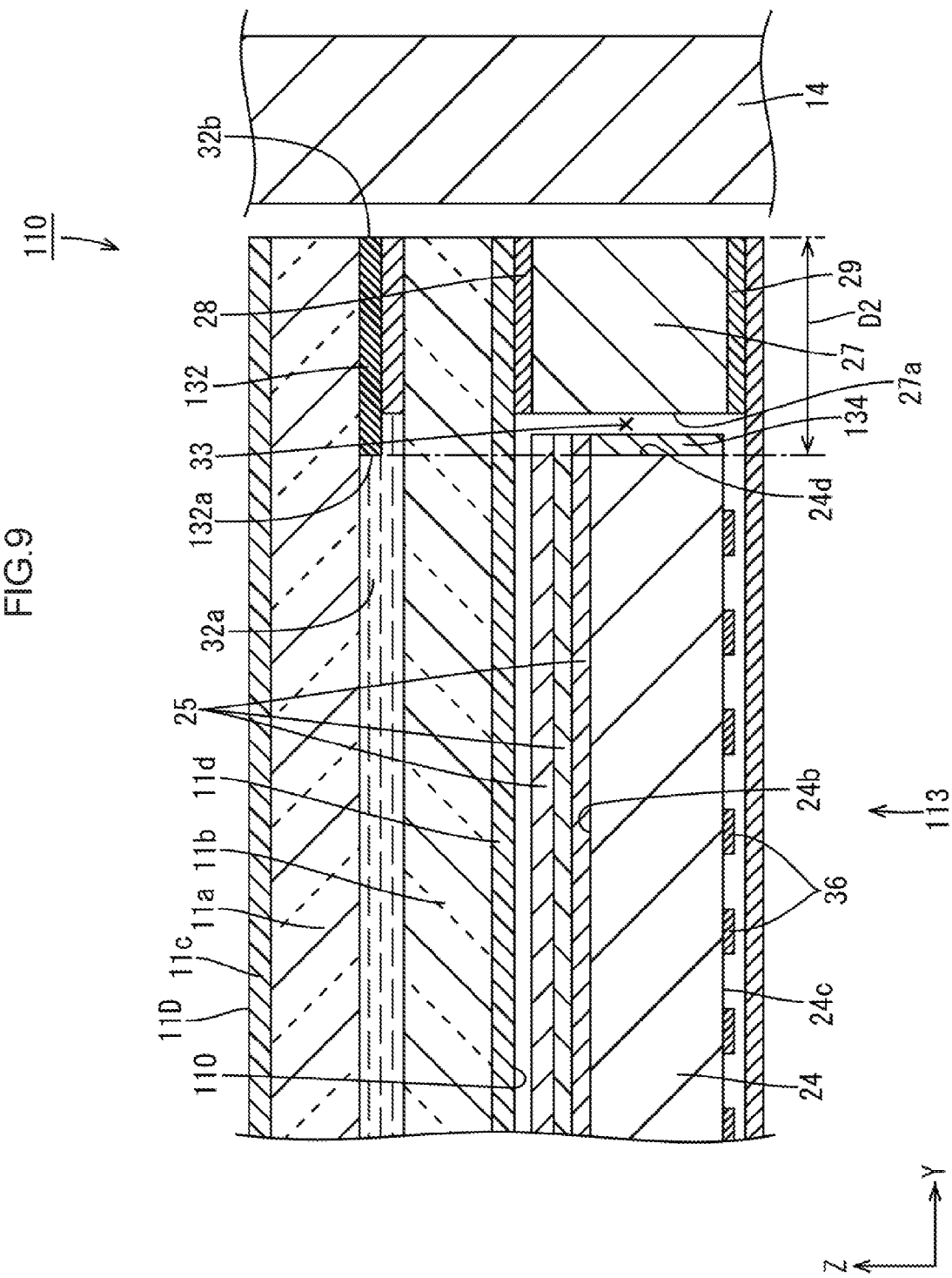
FIG. 9 is a cross-sectional view illustrating a part of a liquid crystal display device according to a second embodiment.

Next, a second embodiment of the present invention will be described with reference to FIG. 9. In the following embodiments, same symbols or numbers as the first embodiment are applied to parts same as those in the first embodiment and they will not be described in detail (regarding configurations or effects). In a backlight device 113 of the present embodiment, configurations of a light reflecting portion 134 and a light blocking layer 132 differ from those of the light reflecting portion 34 and the light blocking layer 32 of the first embodiment.

The opposite edge surface 24d, the edge surface 24e, and the edge surface 24f are directly coated with mirror ink to form a coating film of the light reflecting portion 134 having a mirror surface. Light travelling within the light guide plate 24 toward the edge surfaces 24d, 24e, 24f is reflected by the light reflecting portion 34 with mirror surfaces and travels toward the inside of the light guide plate 24.

The sealing member 11k is covered with the light blocking layer 132 from the front side. A part of rays of light reflected by the light reflecting portion 34 and travelling toward the display surface is not blocked by the light blocking layer 132. Specifically, the light blocking layer 132 has an inner edge 132a that is overlapped with the opposite edge surface 24d, the edge surface 24e, and the edge surface 24f. The light blocking layer 132 has an outer edge 32b that is overlapped with the frame 27 on an upper side. The light blocking layer 132 covers the clearance 33 between the frame 27 and the opposite edge surface 24d (the light reflecting portion 34) to block light travelling toward the front surface through the clearance 33. The light blocking layer 132 does not overlap the edge portion of the light guide plate 24 near the opposite edge surface 24d.

In the present embodiment, the light reflecting portion 34 has a mirror surface and the light travelling within the light guide plate 24 reflects off the mirror surface. Therefore, among the rays of light reflecting off the light reflecting portion 34, the amount of light exiting the opposite edge surface 24d side portion of the light guide plate 24 through the light exit surface 24b is reduced compared to the configuration of the first embodiment. Therefore, even if the outer peripheral edge portion of the backlight device 13 is not covered with the light blocking layer 132, the outer peripheral edge portion of the backlight device 13 is bright and has low visibility. Therefore, the width of the light blocking layer 132 is reduced (D1=0 mm) to further decrease the frame width of the device.

First Modification of Second Embodiment

Next, a first modification of the second embodiment will be described. A liquid crystal display device 110 of the first modification differs from that of the second embodiment in a configuration of the light reflecting portion 134 and a method of forming the light reflecting portion 134. Other configuration and the method are similar to those of the second embodiment and the first modification of the first embodiment. The configuration, the operation, and the effects thereof will not be described.

The light reflecting portion 134 is made of a metal thin film having good light reflectivity such as aluminum, and silver. A film of the light reflecting portion 134 is directly formed on the opposite edge surface 24d, the edge surface 24e, and the edge surface 24f. The light traveling within the light guide plate 24 toward the edge surfaces 24d, 24e, 24f is reflected by the light reflecting portion 134 with mirror surface and returned into the light guide plate 24.

Third Embodiment

Figure 10:
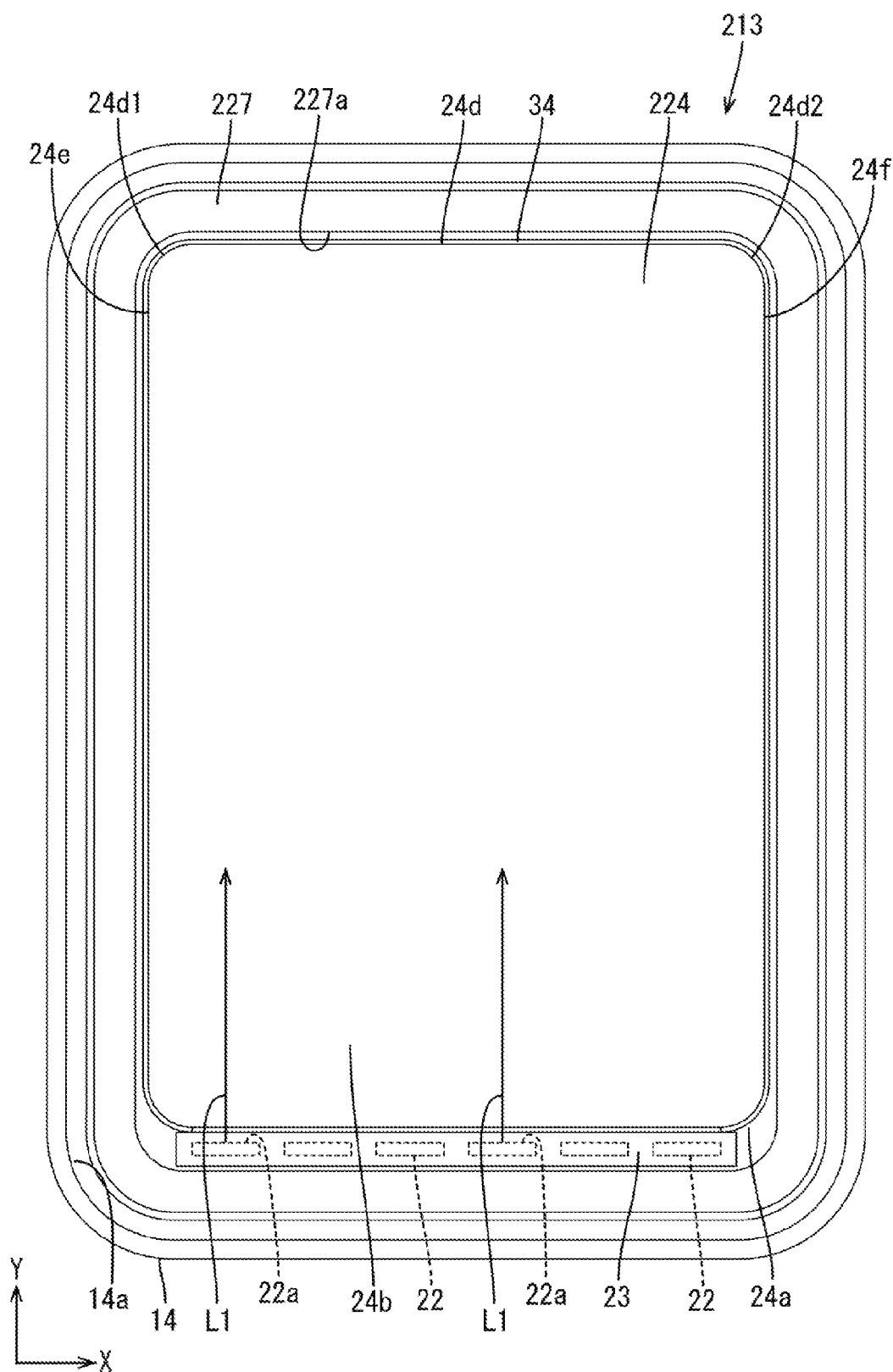
FIG. 10 is a plan view of a lighting device according to a third embodiment (an optical member is not illustrated).

Next, a third embodiment of the present invention will be described with reference to FIG. 10. In the present embodiment, a backlight device 213 will be described. In the backlight device 213 of the present embodiment, a light guide plate 224 and a frame 227 have configurations different from those of the light guide plate 24 and the frame 27 of the first embodiment.

The light guide plate 224 has a rectangular plan view shape as a whole and has four corners each having a round corner shape. In other words, the light guide plate 224 includes curved edge surfaces 24d1, 24d2 having curved planar shape. The curved edge surface 24d1 connects the edge surfaces 24e and 24d, and the curved edge surface 24d2 connects the edge surfaces 24d and 24f. In the present embodiment, the light reflecting portion 34 is formed on the edge surfaces 24e, 24f, and the opposite edge surface 24d including the curved edge surfaces 24d1, 24d2.

The frame 227 has a frame shape extending along the edge surfaces 24a, 24e, 24d, 24f of the light guide plate 224. The frame 227 has an inner peripheral surface 227a opposite the edge surfaces 24e, 24d, 24f of the light guide plate 224 with a certain clearance. The liquid crystal panel 11 and the cover panel 12 have a plan view shape same as an outer shape of the frame 227.

In the present embodiment, the amount of light leaking through the opposite edge surface 24d including the curved edge surfaces 24d1, 24d2 is reduced and the frame width of the backlight device 213 is reduced effectively. Specifically, a clearance is provided between the light guide plate 224 and the frame 227 that is mounted on the light guide plate 224 with considering dimension errors and mounting tolerance. A clearance between the curved edge surfaces 24d1, 24d2 and the frame 227 is generally greater than a clearance between the frame 227 and other edge surfaces having planar straight linear shapes with considering deformation of a molded object. In the device of the present embodiment having the clearance, the amount of light leaking through the curved edge surfaces 24d1, 24d2 and travelling toward the light exit surface through the clearance is reduced by forming the light reflecting portion 34 on the curved edge surfaces 24d1, 24d2.

Fourth Embodiment

Figure 11:
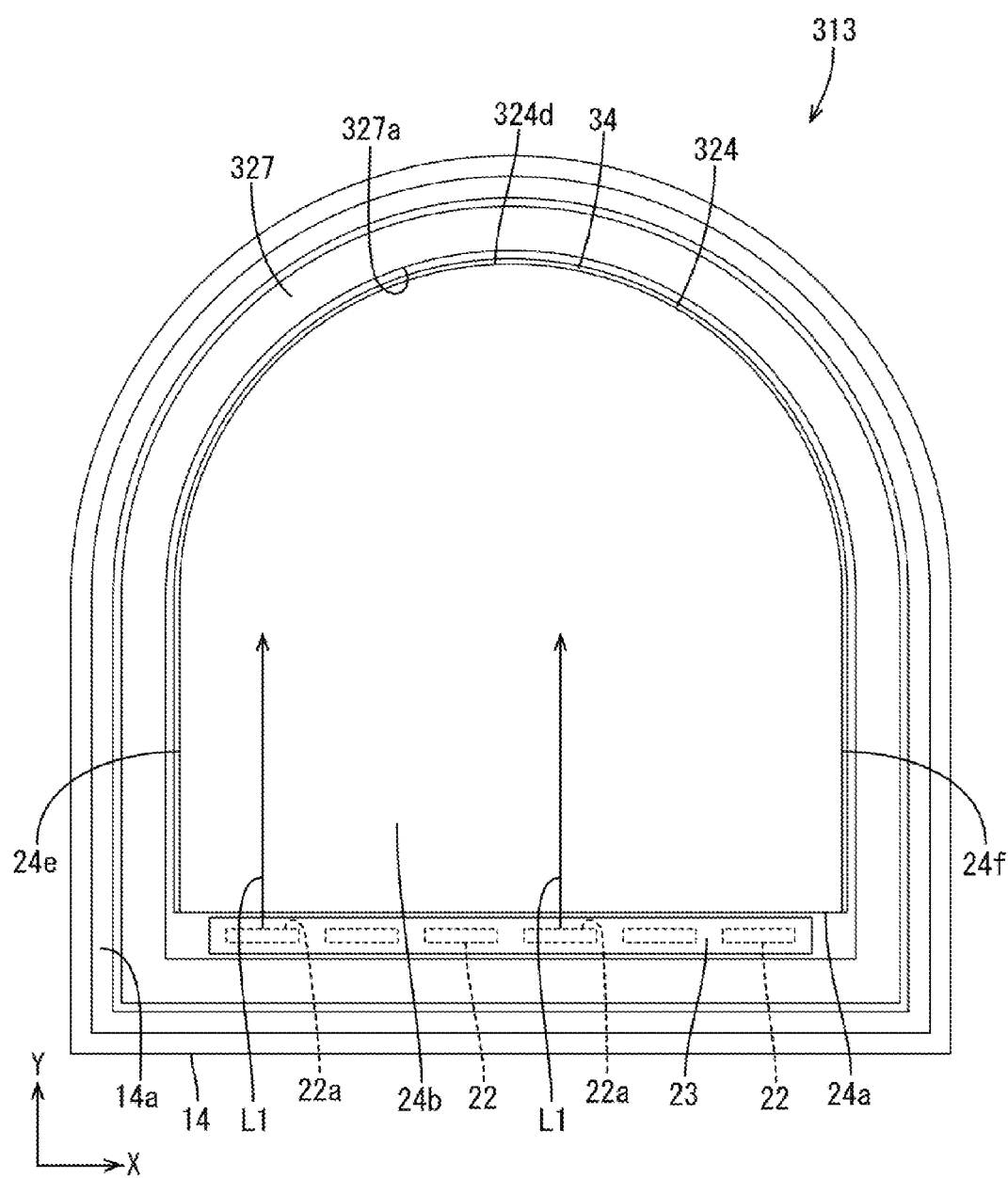
FIG. 11 is a plan view of a lighting device according to a fourth embodiment (an optical member is not illustrated).

Next, a fourth embodiment of the present invention will be described with reference to FIG. 11. In the present invention, a backlight device 313 will be described. In the backlight device 313 of the present embodiment, configurations of a light guide plate 324 and a frame 327 differ from those of the light guide plate 24 and the frame 27 of the first embodiment.

The light guide plate 324 has a semi-elliptic plan view shape that is a half of an oval shape with respect to a short axis. In other words, the light guide plate 324 has the edge surfaces 24a, 24e, 24f that are linear edge surfaces having linear plan view shapes and the opposite edge surface 324d that is a curved edge surface having a curved plan view shape (semi-circular shape). In the present embodiment, the light reflecting portion 34 is disposed on the opposite edge surface 324d and the edge surfaces 24e, 24f.

The frame 327 has a frame shape extending along the edge surfaces 24a, 24e, 24d, 24f of the light guide plate 324. The frame 327 has an inner peripheral surface 327a opposite the edge surfaces 24e, 24d, 24f of the light guide plate 324 with a certain clearance. The liquid crystal panel 11 and the cover panel 12 have a plan view shape same as an outer shape of the frame 327.

In the present embodiment, the amount of light leaking through the opposite edge surface 324d that is a curved edge surface is reduced and the frame width of the backlight device 313 is effectively decreased.

Fifth Embodiment

Figure 12:
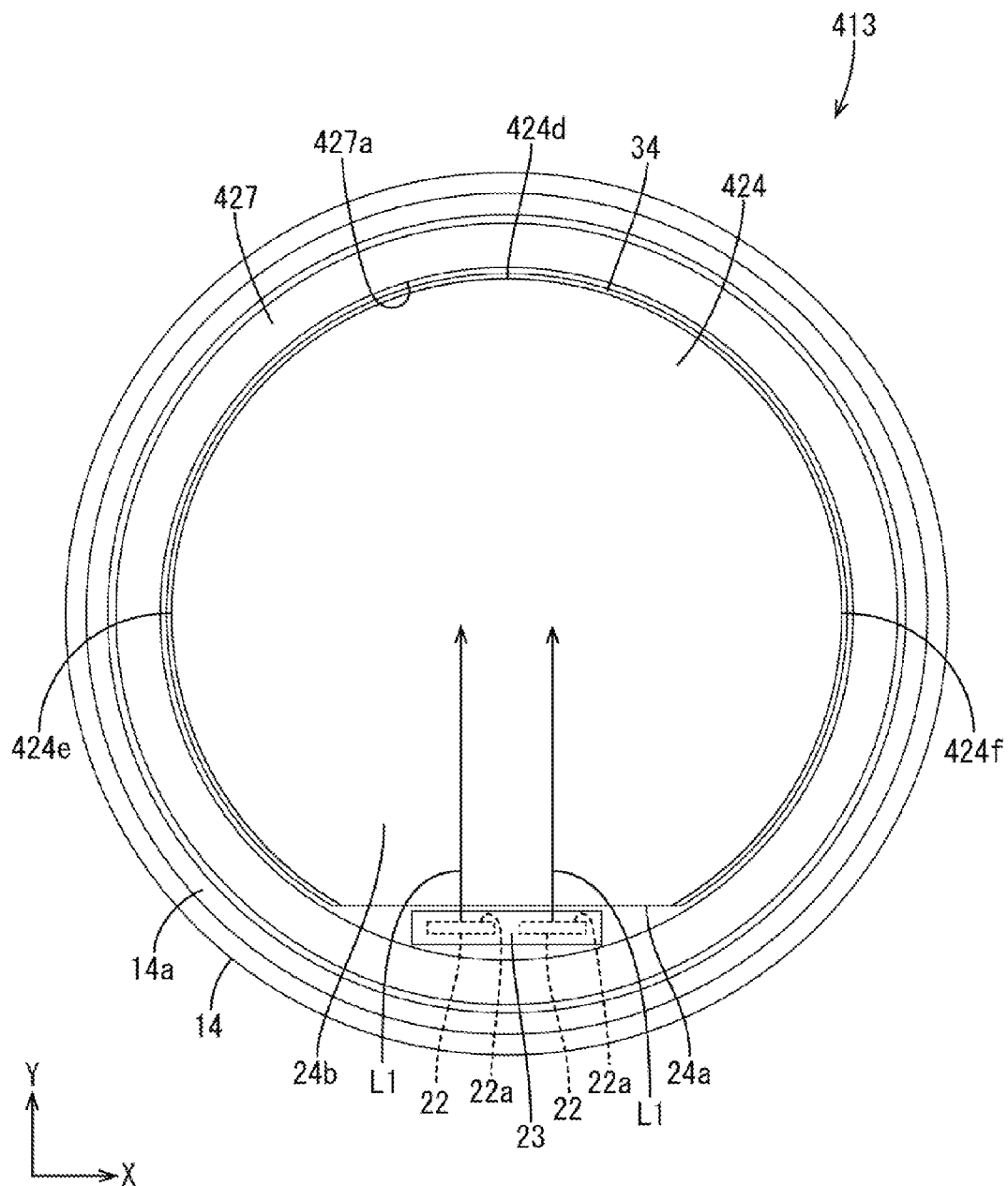
FIG. 12 is a plan view of a lighting device according to a fifth embodiment (an optical member is not illustrated).

A fifth embodiment of the present invention will be described with reference to FIG. 12. In the present embodiment, a backlight device 413 will be described. In the backlight device 413 of the present embodiment, configurations of a light guide plate 424 and a frame 427 differ from those of the light guide plate 24 and the frame 27 of the first embodiment.

The light guide plate 424 has a circular plan view shape as a whole and a part of an outer peripheral edge portion is cut off. In other words, the light guide plate 424 has the edge surface 24a that is a linear edge surface having a linear plan view shape and the opposite edge surface 424d, and the edge surfaces 424e, 424f that are a curved edge surface having a curved plan view shape (arched shape). In the present embodiment, the light reflecting portion 34 is disposed on the opposite edge surface 424d and the edge surfaces 424e, 424f.

The frame 427 has a frame shape extending along the edge surfaces 24a, 424e, 424d, 424f of the light guide plate 424. The frame 427 has an inner peripheral surface 427a opposite the edge surfaces 24e, 424d, 424f of the light guide plate 424 with a certain clearance. The liquid crystal panel 11 and the cover panel 12 have a plan view shape same as an outer shape of the frame 327.

In the present embodiment, the amount of light leaking through the opposite edge surface 424d that is a curved edge surface is reduced and the frame width of the backlight device 413 is effectively decreased.

Sixth Embodiment

Next, a sixth embodiment of the present invention will be described with reference to FIGS. 13 and 14. In the present embodiment, a liquid crystal display device 510 including a backlight device 513 will be described. In the present embodiment, configurations of the liquid crystal panel 11 and the backlight device 513 differ from those of the liquid crystal panel 11 and the backlight device 13 of the first embodiment in that a through hole 11H and a through hole 513H are formed in the liquid crystal panel 11 and the backlight device 513, respectively.

Figure 13:
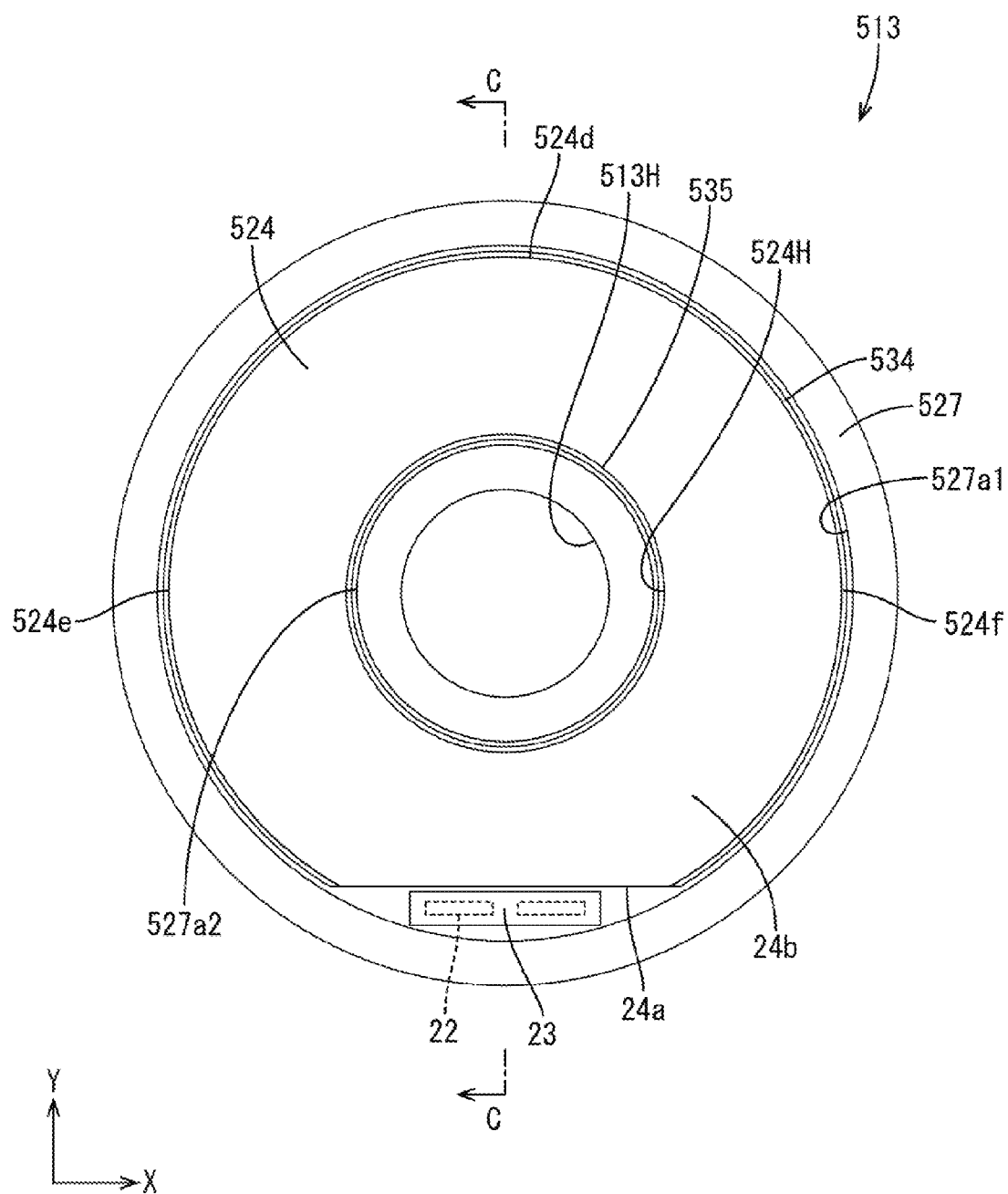
FIG. 13 is a plan view of a lighting device according to a sixth embodiment (an optical member is not illustrated).

As illustrated in FIG. 13, the liquid crystal panel 11 has a plan view doughnut shape and the through hole 11H that is through a thickness thereof. A light blocking layer 532 is formed along an outer peripheral edge and an inner peripheral edge of the liquid crystal panel 11.

As illustrated in FIG. 13, the light guide plate 524 has a plan view doughnut shape as a whole and a part of the outer peripheral portion is cut off and has a linear edge. In other words, the light guide plate 524 has the edge surface 24a that is a linear edge surface having a plan view linear shape and the opposite edge surface 524d and the edge surfaces 524e, 524f that are curved edge surfaces having a plan view curved shape (arched shape). The light guide plate 524 has the through hole 524H that is through a plate thickness thereof.

Figure 14:
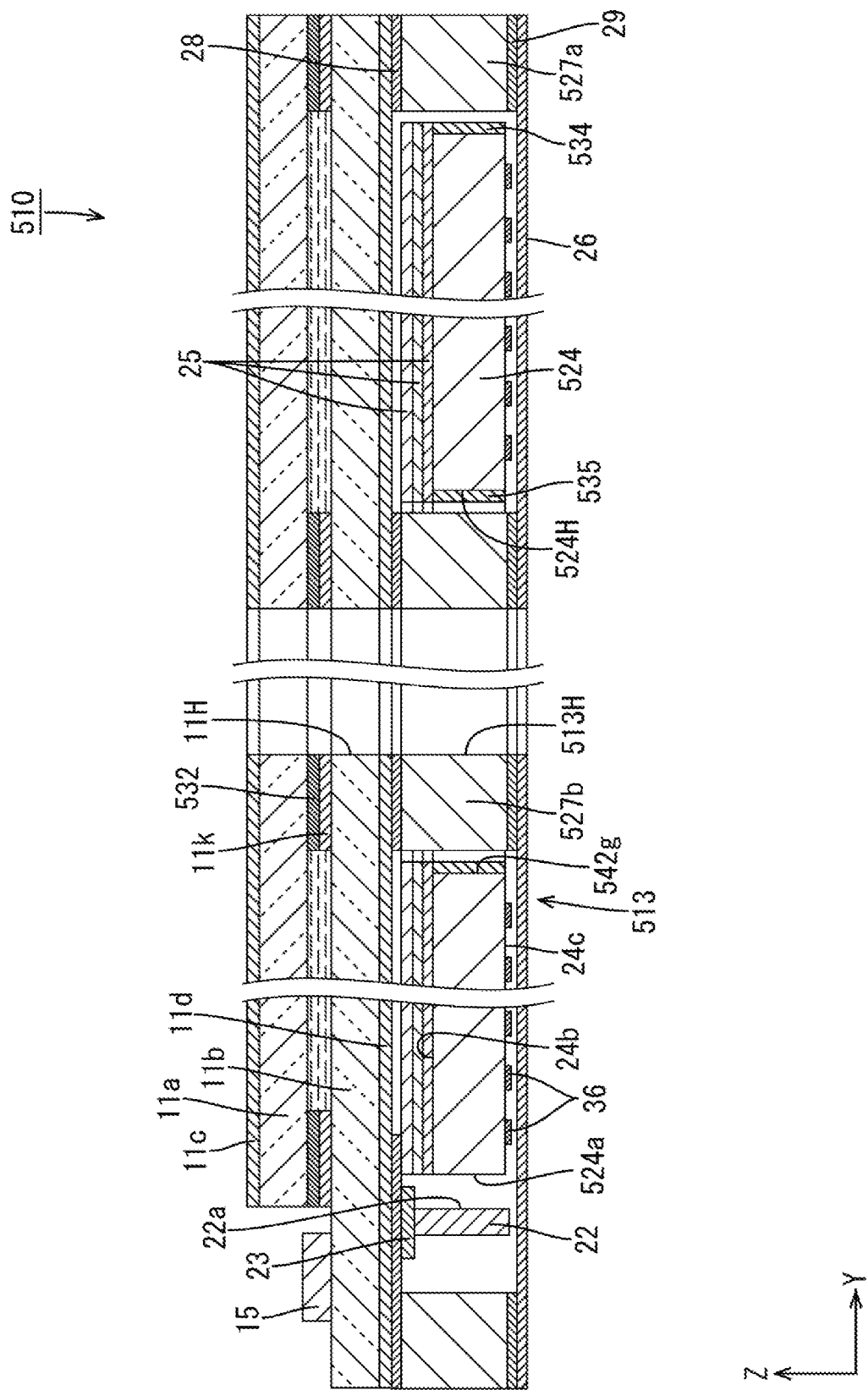
FIG. 14 is a cross-sectional view illustrating a part of a liquid crystal display device including the lighting device of FIG. 13 (a cross-sectional view taken along line C-C in FIG. 13).

As illustrated in FIG. 14, an inner peripheral surface light reflecting portion 535 is disposed closely on an inner peripheral edge surface 524g of the through hole 524H. Light travelling within the light guide plate 524 toward the through hole 524H reflects off the inner peripheral surface light reflecting portion 535. A light reflecting portion 534 is formed on the opposite edge surface 524d and the edge surfaces 524e, 524f. Configurations of the light reflecting portion 534 and the inner peripheral surface reflecting portion 535 and a method of forming thereof are same as those of the light reflecting portion 34 and will not be described.

The frame 527 has a frame shape extending along the edge surfaces 24a, 524e, 524d, 524f of the light guide plate 524 and extending along the inner peripheral edge surface 524g of the through hole 524H of the light guide plate 524. The frame 527 has an outer-side inner peripheral surface 527a opposite the opposite edge surface 524d and edge surfaces 524e, 524f with a certain clearance therebetween and an inner-side inner peripheral surface 527b opposite the inner peripheral edge surface 524g of the light guide plate 524 with a certain clearance therebetween.

In the light guide plate 524 having the through hole 534H, a portion opposite from the light entrance surface 524a with respect to the through hole 524H is less likely to receive light travelling within the light guide plate 524 because the through hole 524H is between the light entrance surface 524a and the portion. However, in the present embodiment, the light reflecting off the light reflecting portion 534 and the inner peripheral surface light reflecting portion 535 exits the portion opposite from the light entrance surface 524a. Therefore, brightness is less likely to be lowered in the portion.

Seventh Embodiment

Next, a seventh embodiment of the present invention will be described with reference to FIGS. 15 to 18. In the present embodiment, a liquid crystal display device 610 including a backlight device 613 will be described. In the present embodiment, an opposite edge surface 624d of a light guide plate 624 has a shape different from that of the opposite edge surface 24d of the light guide plate 34 of the first embodiment. In the present embodiment, a light reflecting portion forming process differs from that in the first embodiment.

Figure 15:
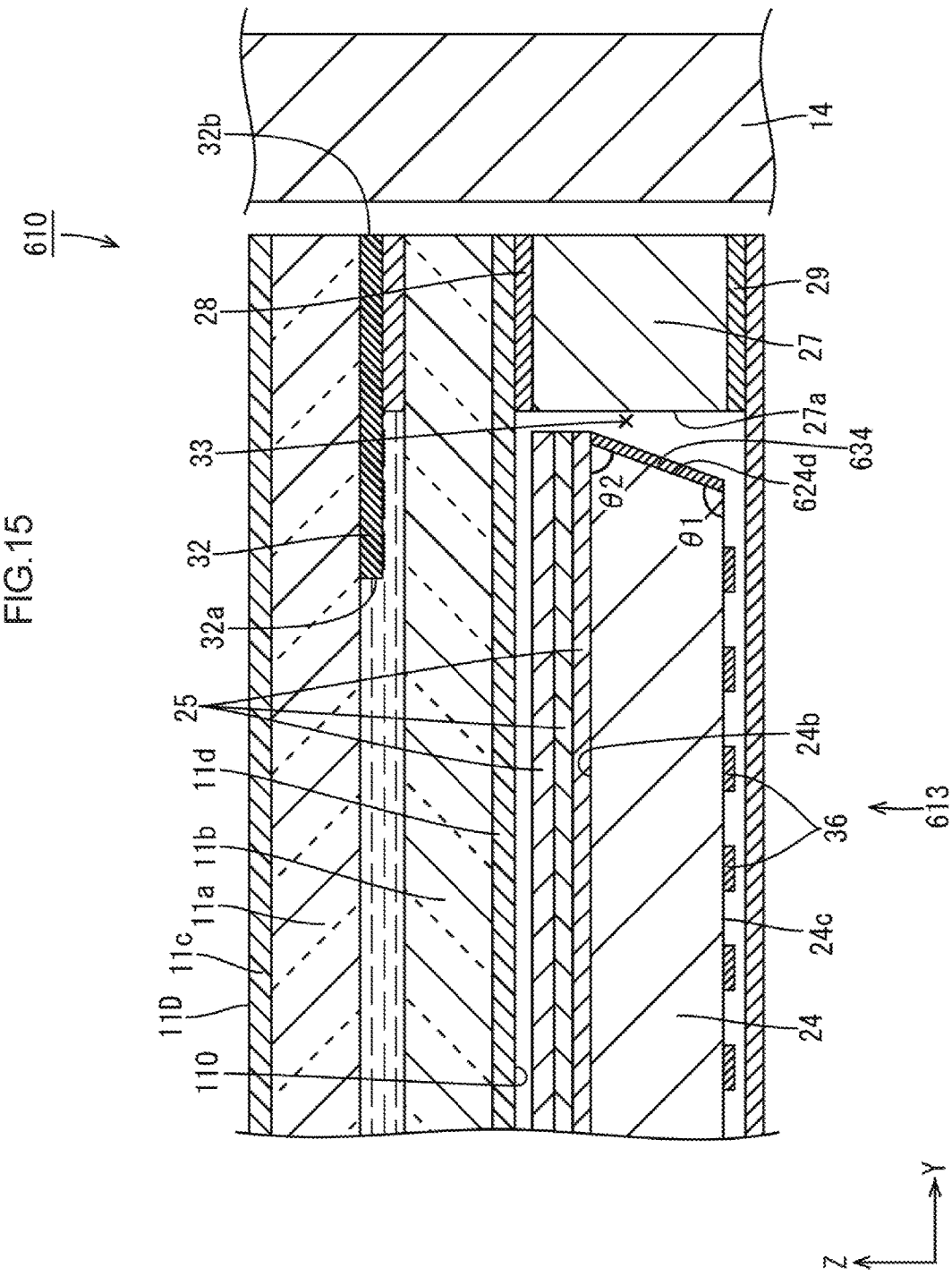
FIG. 15 is a cross-sectional view illustrating a part of a liquid crystal display device according to a seventh embodiment.

As illustrated in FIG. 15, the light guide plate 624 has a rectangular plan view shape and is a vertically long plate member having a plate surface parallel to a plate surface of the liquid crystal panel 11. Specifically, the light guide plate 624 is a thin plate member having a thickness of 6 mm or less and has edge surfaces 624d, 24e, 24f each of which has a rectangular shape and is an inclined surface inclined with respect to a rear-side plate surface 24c at an obtuse angle. The light entrance surface 24a extends from the rear-side plate surface 24c at an angle of approximately 90 degrees similarly to the first embodiment. Specifically, each of the edge surfaces 624d, 24e, 24f forms an angle θ1 with the rear-side plate surface 24c and the angle θ1 is preferably from 110° to 150° (110°<θ1<150°). The light guide plate 624 has a front-side plate surface 24b and the rear-side plate surface 24c that are parallel to each other. The opposite edge surface 624d and the front-side plate surface 24b form an angle θ2 and the angle θ2 is preferably from 30° to 70° (30°<θ2<70°). If the angle θ1 is greater than 110°, coating material for forming the light reflecting portion is preferably printed as will be described later. If the angle θ2 is greater than 30°, molding properties of corner portions of the edge surfaces having the angle θ1 are less likely to be deteriorated and tip portions of the corner portions are less likely to be lacked in forming the light guide plate 624.

A method of manufacturing the backlight device 613 of the present embodiment includes a light reflecting portion forming process for forming the light reflecting portion 634. In the light reflecting portion forming process, the light reflecting portion 634 and the other plate surface-side light reflecting portion 36 are collectively formed with screen printing using a screen having flexibility.

Figure 16:
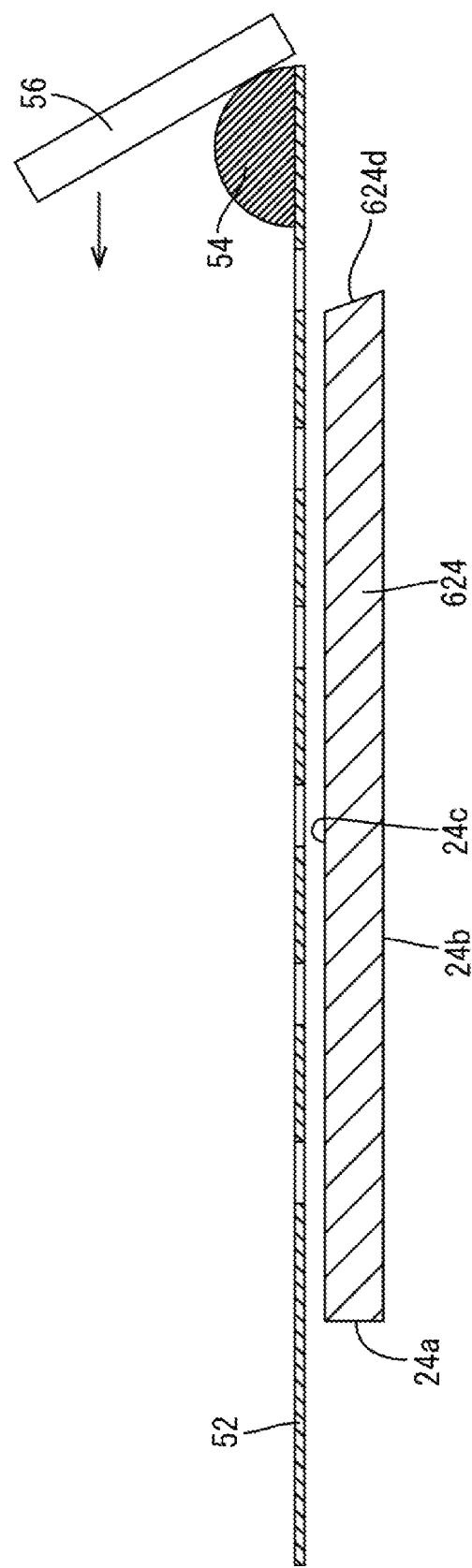
FIG. 16 is a view illustrating that a light reflection portion is formed in a light reflection portion forming process.
Figure 17:
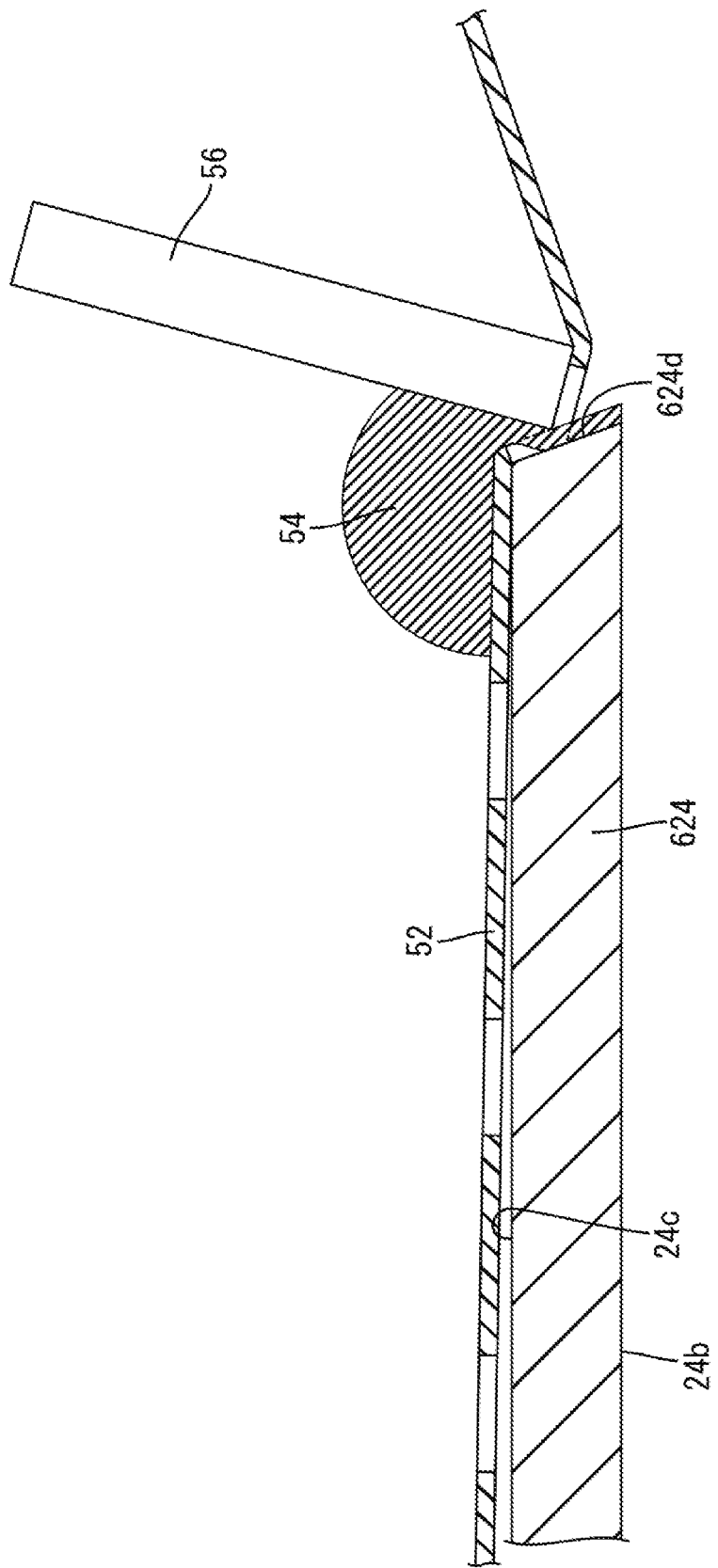
FIG. 17 is a view illustrating a process of forming the light reflection portion in FIG. 15.
Figure 18:
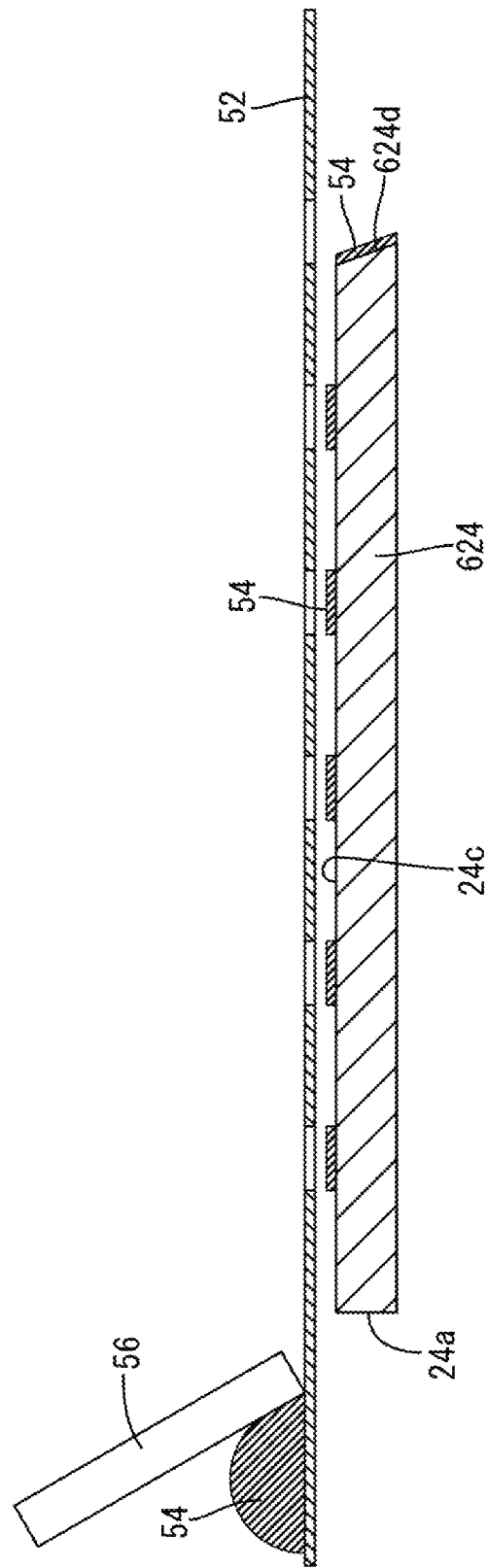
FIG. 18 is a view schematically illustrating that the light reflection portion is formed in FIG. 15.

Specifically, the light guide plate 624 is arranged such that the rear-side plate surface 24c faces upward and a screen 52 having a predetermined pattern is arranged on the light guide plate 624 (see FIG. 16). Then, coating material 54 containing light reflective particles is disposed on the screen 52 and the coating material 54 is pressed down toward the opposite edge surface 624d from the upper surface of the screen 52 by the squeegee 56 and the squeegee 56 is moved toward the rear-side plate surface 24c (see FIG. 17). Continuously, the coating material 54 and the screen 52 are pressed down toward the rear-side plate surface 24c by the squeegee 56 and the squeegee 56 is moved toward the light exit surface 24a. The coating material 54 passes through mesh of the screen 52 and the opposite edge surface 624d and the rear-side plate surface 24c are coated with the coating material 54 (see FIG. 18). After the coating material 54 is dried, a coating film is collectively formed on the opposite edge surface 624d and the rear-side plate surface 24c. Thus, the light reflecting forming process is finished. The edge surfaces 24e, 24f may be coated with the coating material 54 at the same time.

According to the present embodiment, the other plate surface-side light reflecting portion 34 and the light reflecting portion 634 are collectively formed easily and the number of steps of the manufacturing process is reduced. In the present embodiment, the light guide plate having the same plate thickness as that of the first embodiment has a greater area of the opposite edge surface 624d compared to the area of the opposite edge surface 24d of the first embodiment. Therefore, a contact area between the light reflecting portion 624 and the opposite edge surface 624d is increased and the light reflecting portion 634 is less likely to be removed from the edge surface.

Eighth Embodiment

Next, an eighth embodiment of the present invention will be described with reference to FIGS. 19 and 20. In the present embodiment, a light reflecting portion forming process differs from that in the seventh embodiment.

In the light reflecting portion forming process of the present embodiment, a pad member 62 having flexibility is pressed on the opposite edge surface 624d and the rear-side plate surface 24c. Accordingly, a light reflecting portion 634 and the other plate surface-side light reflecting portion 36 are collectively formed with pad printing.

Figure 19:
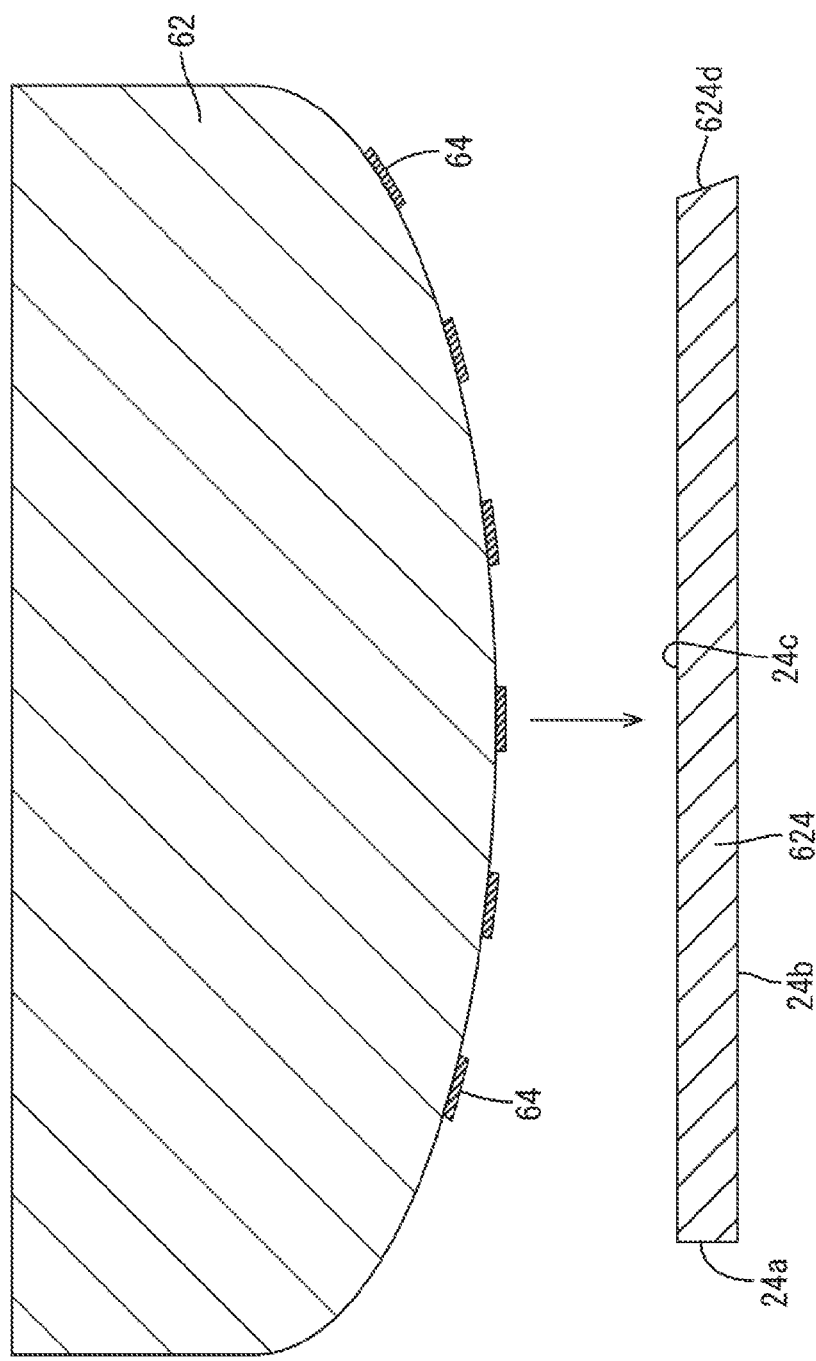
FIG. 19 is a view schematically illustrating that a light reflection portion is formed in a light reflection portion forming process according to an eighth embodiment.
Figure 20:
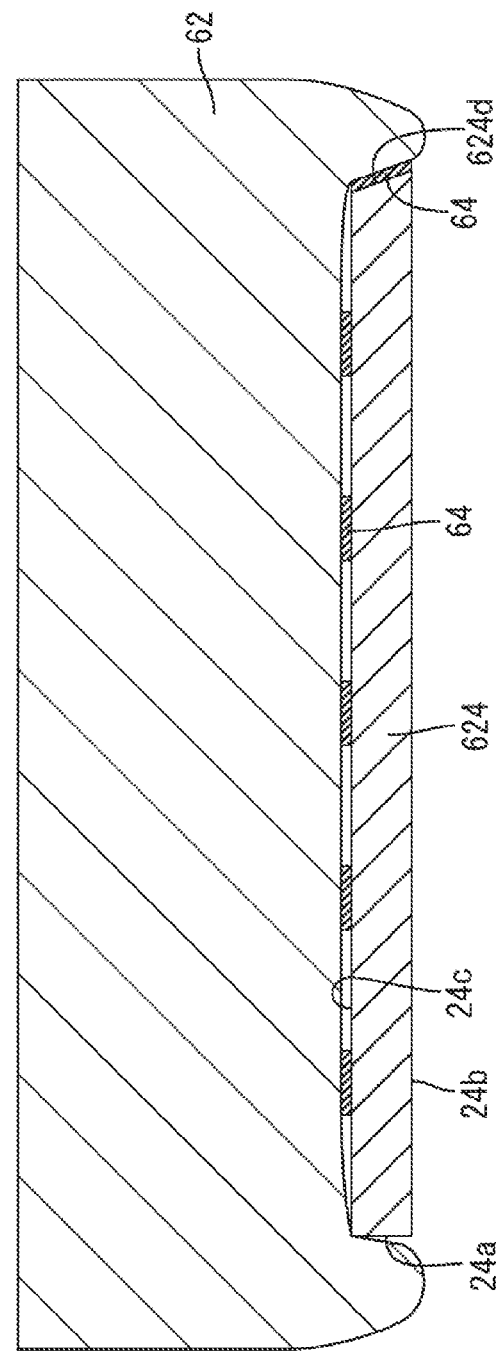
FIG. 20 is a view illustrating a process of forming the light reflection portion in FIG. 18.

Specifically, a predetermined pattern formed with the coating material 64 is transferred on the pad member 62 and the pad member 62 is moved closer to the light guide plate 24 (in a direction of an arrow in FIG. 19). The pad member 62 is pressed on the opposite edge surface 624d and the rear-side plate surface 24c and the coating material 64 is transferred to the light guide plate 24 (see FIG. 20). The pad member 62 is elastically deformed along the opposite edge surface 624d and the rear-side plate surface 24c so that the coating material 64 is collectively disposed on the opposite edge surface 624d and the rear-side plate surface 24c. After the coating material 64 is dried, the coating film is collectively formed on the opposite edge surface 624d and the rear-side plate surface 24c. Thus, the light reflecting portion forming process is finished. In the process, the coating material 64 may be disposed on the edge surfaces 24e, 24f at the same time.

Ninth Embodiment

Figure 21:
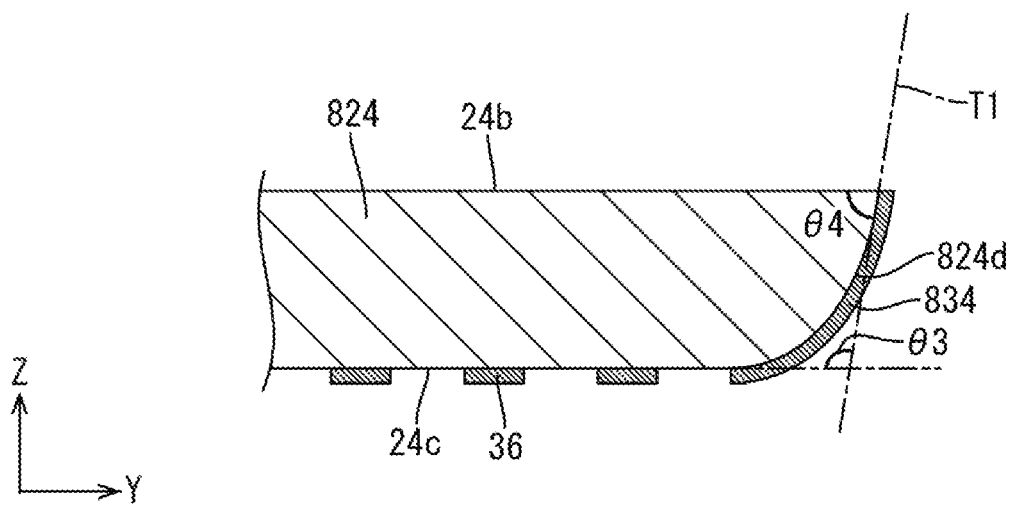
FIG. 21 is a cross-sectional view illustrating a part of a light guide plate and a light reflection portion according to a ninth embodiment.

Next, a ninth embodiment of the present invention will be described with reference to FIG. 21. In the present embodiment, a shape of an opposite edge surface 824d of a light guide plate 824 differs from that of the opposite edge surface 624d of the light guide plate 634 of the seventh embodiment. A light reflecting portion forming process for forming a light reflecting portion 834 is similar to that of the seventh embodiment or the eighth embodiment.

The light guide plate 824 has a rectangular plan view shape and is a vertically long plate member having a plate surface parallel to a plate surface of the liquid crystal panel 11. Specifically, the light guide plate 824 is a thin plate member having a thickness of 6 mm or less and has edge surfaces 824d, 24e, 24f each of which is a curved surface. A tangent line T1 to the curved surface and the rear-side plate surface 24c form an obtuse angle. The light entrance surface 24a extends from the rear-side plate surface 24c at an angle of approximately 90 degrees similarly to the first embodiment. Specifically, an angle θ3 formed by the tangent line T1 and the rear-side plate surface 24c is preferably from 110° to 150° (110°<θ3<150°). In the present embodiment, no angled portion is provided between the rear plate surface 24d and each of the edge surfaces 824d, 24e, 24f, and smooth and continuous portions are provided therebetween. The light guide plate 824 has a front-side plate surface 24b and the rear-side plate surface 24c that are parallel to each other. The opposite edge surface 624d and the front-side plate surface 24b form an angle θ4 and the angle θ4 is preferably from 30° to 70° (30°<θ4<70°). If the angle θ3 is greater than 110°, coating material for forming the light reflecting portion 34 is preferably printed. In the present embodiment, each of the edge surfaces 824d, 24e, 24f is connected to the rear-side plate surface 24c in a curved shape. Therefore, it is preferable to execute the printing operation collectively on both of the edge surfaces 824d, 24e, 24f and the rear-side plate surface 24c. If the angle θ4 is greater than 30°, molding properties of corner portions of the edge surfaces having the angle θ4 are less likely to be deteriorated and tip portions of the corner portions are less likely to be lacked.

In the present embodiment, the other plate surface-side light reflecting portion 36 and the light reflecting portion 834 are collectively formed easily, and the number of the manufacturing steps is reduced. In the present embodiment, the light guide plate having the same plate thickness as that of the first embodiment has a greater area of the opposite edge surface 624d compared to the area of the opposite edge surface 24d of the first embodiment. Therefore, a contact area between the light reflecting portion 824 and the opposite edge surface 824d is increased and the light reflecting portion 824 is less likely to be removed from the edge surface.

Tenth Embodiment

Figure 22:
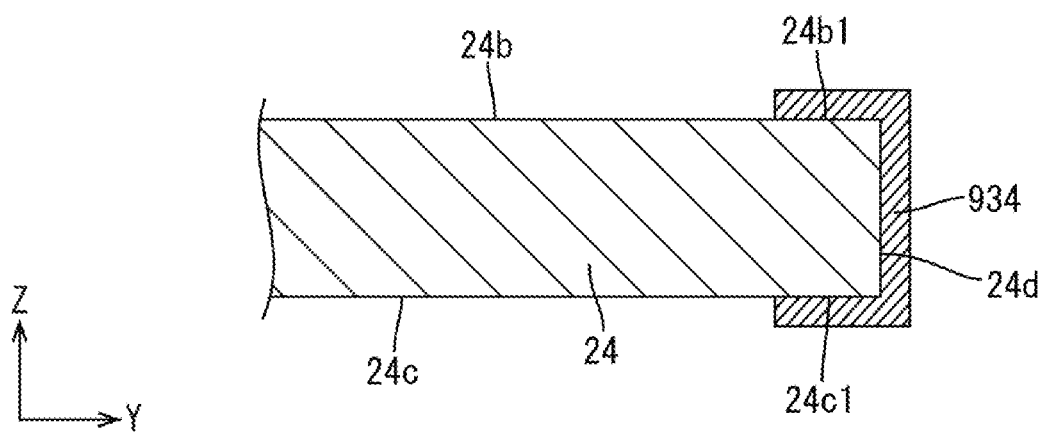
FIG. 22 is a cross-sectional view illustrating a part of a light guide plate and a light reflection portion according to a tenth embodiment.
Figure 23:
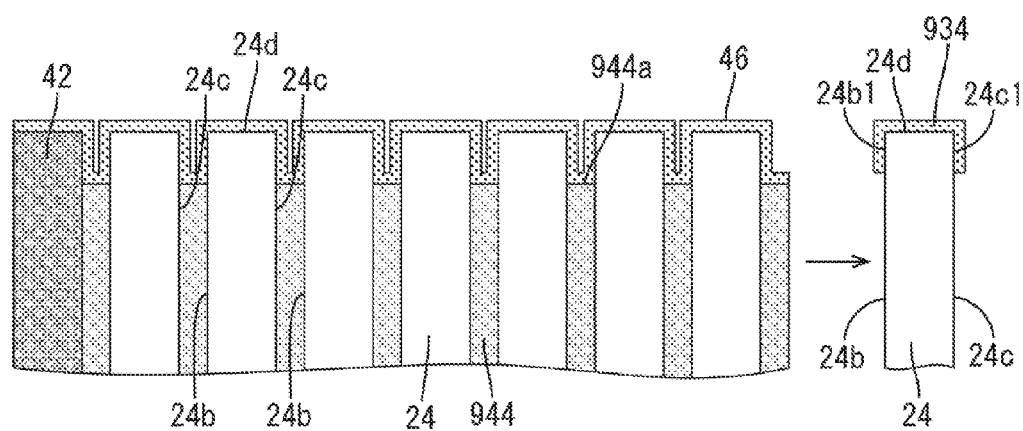
FIG. 23 is a view schematically illustrating that the light reflection portion is formed in the light reflection portion forming process.

A tenth embodiment of the present invention will be described with reference to FIGS. 22 and 23. A light reflecting portion 934 of the present embodiment is formed in an area different from an area where the light reflecting portion 34 of the first embodiment and the first modification of the first embodiment is formed.

The light reflecting portion 934 is formed on an edge portion 24b1 of the light exit surface 24b near the opposite edge surface 24d, the opposite edge surface 24d, and an edge portion 24c1 of the rear-side plate surface 24c near the opposite edge surface 24d. The light reflecting portion 934 is formed in a cross-sectional U shape. Specifically, the light reflecting portion 934 extends by approximately 0.1 mm to 2 mm from edges of the opposite edge surface 24d along the light exit surface 24b and the rear-side plate surface 24c, respectively. As the length from the opposite edge surface 24d is increased, the light reflecting portion 934 is likely to cover error portions, which will be described later. On the other hand, light does not exit a portion of the light exit surface 24b corresponding to a portion where the light reflecting portion 934 is formed, and this may hinder reduction in the frame width of the backlight device 13. With considering the above matters, the extension dimension of the reflecting portion 934 is preferable as described above. The light reflecting portion 934 is formed on the edge surfaces 24e, 24f similarly to the opposite edge surface 24d.

A portion of the light reflecting portion 934 formed on the edge portion 24b1 of the light exit surface 24b functions as a light blocking layer that blocks light reflecting off the light reflecting portion 934 toward the light exit surface 24b. In other words, the portion of the light reflecting portion 934 supplements the function of the light blocking layer 32 of the first embodiment or blocks the light for the light blocking layer 32. The portion of the light reflecting portion 934 blocks light reflecting off the opposite edge surface 24d closer to the opposite edge surface 24d than the light blocking layer 32. Therefore, the width of the portion on the edge portion 24b1 is likely to be smaller than that of the light blocking layer 32.

In a light reflecting portion forming process of the present embodiment, the light guide plates 24 and protection plate members 944 for protecting the plate surfaces 24b, 24c of the light guide plate 24 are alternately arranged in the thickness direction without having space therebetween. Further, the protection plate members 944 are arranged such that edge surfaces 944a thereof are recessed from the opposite edge surfaces 24d of the light guide plates 24. Then, a coating film containing particles having light reflectivity or a metal thin film having light reflectivity is formed on the opposite edge surface 24d side edge portions 24b1 of the light exit surfaces 24b of the light guide plates 24, the opposite edge surfaces 24d of the light guide plates 24, and the opposite edge surface 24d side edge portions 24c1 of the rear-side plate surfaces 24c of the light guide plates 24. Thus, the light reflecting portion 934 is collectively formed on the light guide plates 24. The protection plate member 944 has a plate surface smaller than that of the light guide plate 24. Other configurations are same as those of the first embodiment or the first modification of the first embodiment and will not be described.

The light guide plate 24 is formed with injection molding using transparent resin. Therefore, sink marks may be caused in molding or lacking or damage may be caused after molding. Such errors are likely to be caused near the edge surfaces 24a, 24d, 24e, 24f and light is likely to leak from the portion where the errors are caused and therefore the leaking light may be seen as a bright spot. In the present embodiment, the light reflecting portion 934 is disposed on the portions near at least the edge surfaces 24d, 24e, 24f to cover the errors and the bright spot is less likely to be caused. In the present embodiment, compared to the configuration of the first embodiment, the contact area between the light reflecting portion 934 and the light guide plate 24 is increased and the light reflecting portion 934 is less likely to be removed from the edge surface.

Eleventh Embodiment

Figure 24:
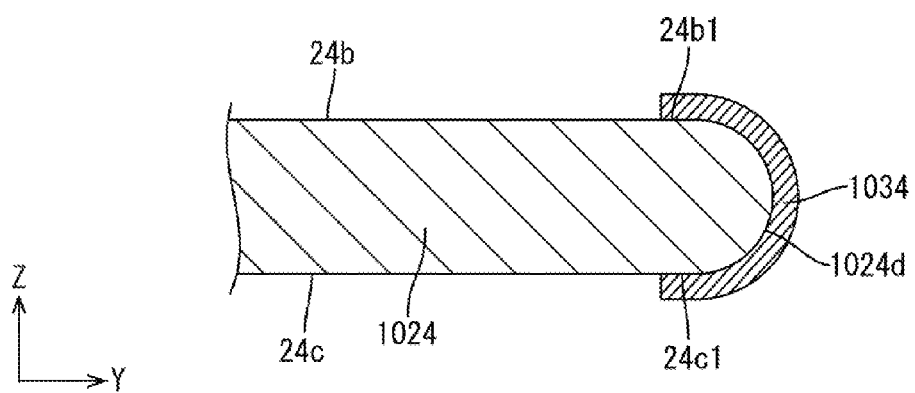
FIG. 24 is a cross-sectional view illustrating a part of a light guide plate and a light reflection portion according to an eleventh embodiment.

Next, an eleventh embodiment of the present invention will be described with reference to FIG. 24. In the present embodiment, a light guide plate 1024 and a light reflecting portion 1034 have shapes different from those of the light guide plate 24 and the light reflecting portion 934 of the tenth embodiment.

The light guide plate 1024 has an opposite edge surface 1024d that is a curved surface having a semicircular cross sectional shape. The light reflecting portion 1034 is formed on an edge portion 24b1 of the light exit surface 24b near the opposite edge surface 24d, the opposite edge surface 1024d, and an edge portion 24c1 of the rear-side plate surface 24c near the opposite edge surface 24d. The light reflecting portion 1034 is formed in a cross-sectional U shape. Other configurations and operations are same as those of the tenth embodiment and will not be described.

Twelfth Embodiment

Figure 25:
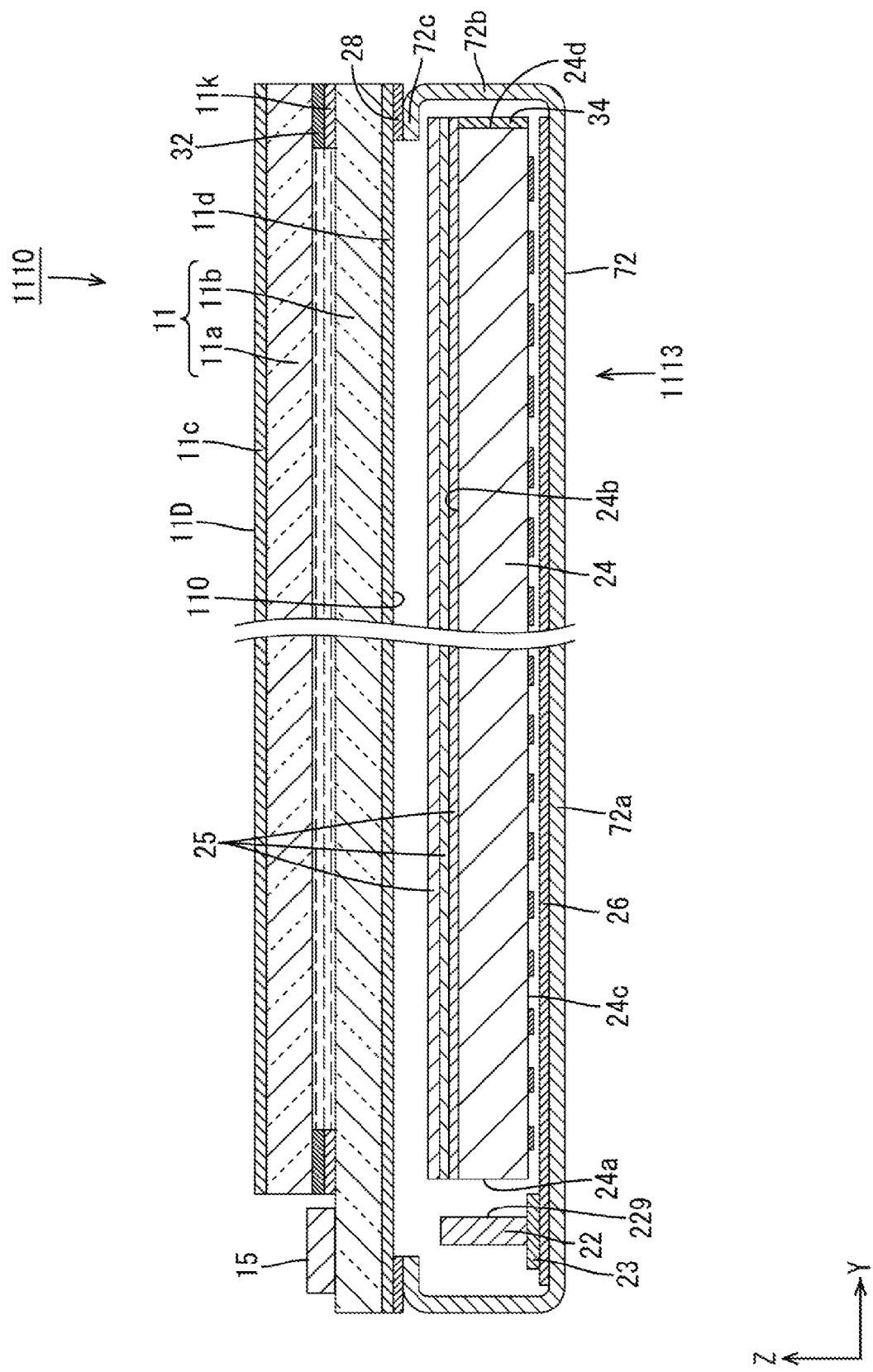
FIG. 25 is a cross-sectional view of a liquid crystal display device taken along a long-side direction thereof according to a twelfth embodiment.

Next, a twelfth embodiment of the present invention will be described with reference to FIG. 25. In a liquid crystal display device 1110 of the present embodiment, a backlight device 1113 does not include the frame 27 but includes a metal frame 72 unlike the first embodiment.

The metal frame 72 is made of metal having light reflectance lower than that of the light reflecting portion 34 made of stainless steel. The metal frame 72 has a substantially box shape and includes a bottom surface 72a, side walls 72b extending upward from an outer peripheral edge of the bottom surface 72a, and extended portions 72c extending from extended edges of the side walls 72b inwardly. The side walls 72b face the edge surfaces 24a, 24d, 24c, 24f of the light guide plate 24. The liquid crystal panel 11 is placed on upper surfaces of the extended portions 72c. The metal frame 72 is configured to receive at least the LEDs 22 and the light guide plate 24 therein.

The backlight device 1113 has a backlight frame from the edge surface of the light guide plate 24 to an outer peripheral edge of the backlight device 1113. In the present embodiment, a dimension of the backlight frame from each of the opposite edge surface 24d and the edge surfaces 24e, 24f to the outer peripheral edge of the metal frame 72 is approximately 0.6 mm. The metal frame 72 has a thickness smaller than that of the frame 27 and is preferable to reduce the frame of the backlight device. The side wall of the casing 14 has a thickness of approximately 1.5 mm and the frame width of the liquid crystal display device 1110 is approximately 2.2 mm if the backlight device 1113 is mounted in the casing 14 with mounting tolerance of 0.1 mm. In the present embodiment, screen luminance of the backlight device 1113 is approximately 540 $cd/m^2$ and the screen luminance is improved compared to a backlight device without including the light reflecting portion 34.

In the present embodiment, if the metal frame 72 is made of stainless steel, which is generally used and has low light reflectance (light reflectance of approximately 600), light leaking through the opposite edge surface 24d and absorbed by the metal frame 72 is reflected by the light reflecting portion 34 and exits the light guide plate 24 through the light exit surface 24b. Thus, brightness of the backlight device 13 is preferably improved.

Thirteenth Embodiment

Figure 26:
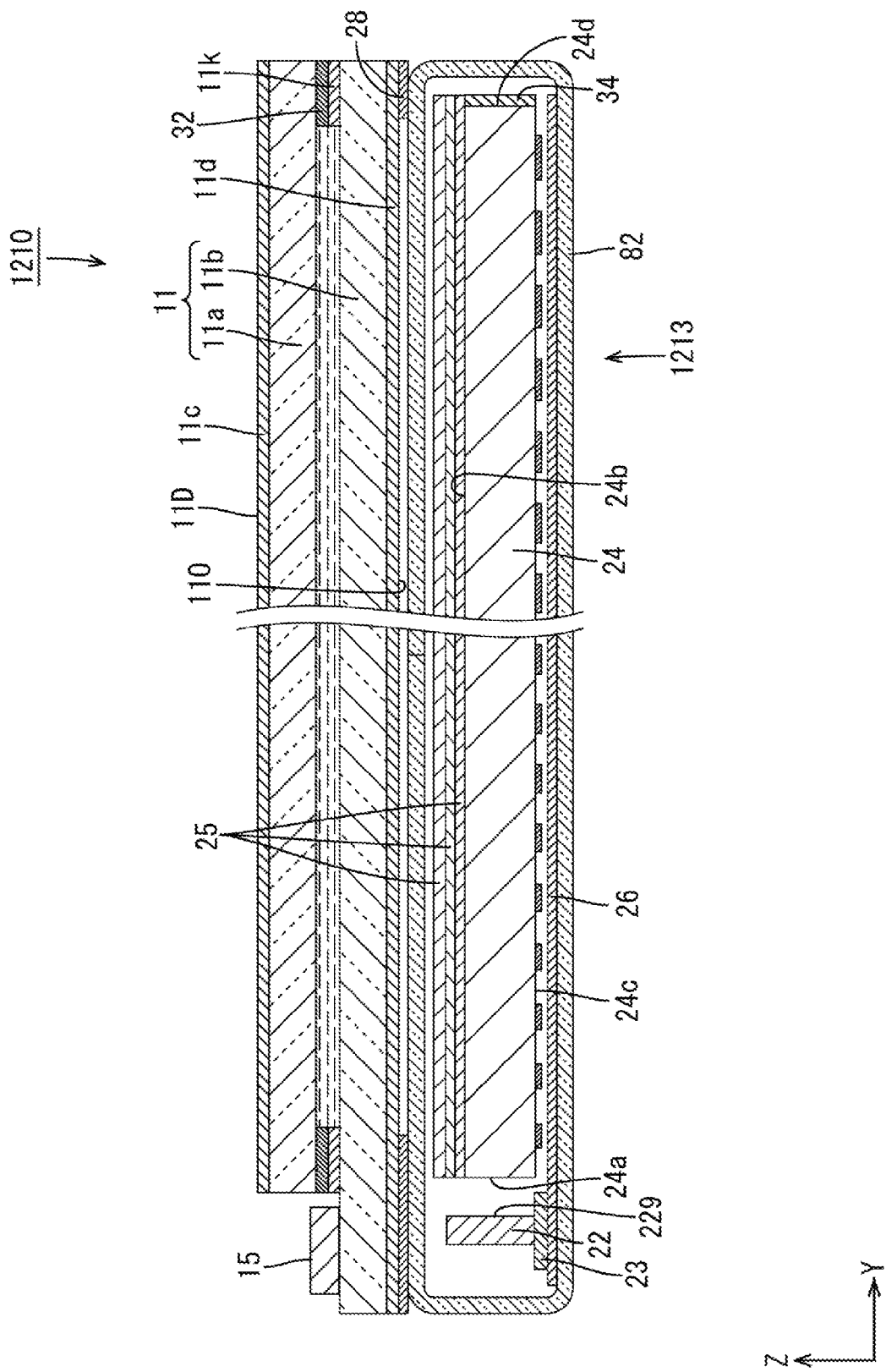
FIG. 26 is a cross-sectional view of a liquid crystal display device taken along a long-side direction thereof according to a thirteenth embodiment.

Next, a thirteenth embodiment of the present invention will be described with reference to FIG. 26. In a liquid crystal display device 1210 of the present embodiment, a backlight device 1213 does not include the frame 27 but includes a surrounding member 82 having light transmissivity unlike the first embodiment.

The surrounding member 82 has a form of a film, a sheet, or a bag having a thickness of approximately 5 μm to 5000 μm. The surrounding member 82 is configured to cover the light exit surface 24b and the opposite edge surface 24d and collectively surround at least the LEDs 22 and the light guide plate 24 and the components are mounted in each other. Specifically, the surrounding member 82 has a belt-like shape having flexibility and extends such that a longitudinal direction matches the longitudinal direction of the light guide plate 24. The surrounding member 82 extends along the upper surface of the optical sheet 25, the opposite edge surface 24d of the light guide plate 24, and the lower surface of the light reflecting sheet 26. As is not illustrated in FIG. 26, the LEDs 22 may be arranged in a lamp reflector that is open toward the light entrance surface 24a of the light guide plate 24.

The backlight device 1213 has a backlight frame from the edge surface of the light guide plate 24 to an outer peripheral edge of the backlight device 1213. In the present embodiment, a dimension of the backlight frame from each of the opposite edge surface 24d and the edge surfaces 24e, 24f to the outer peripheral edge of the surrounding member 82 is approximately 0.2 mm. The surrounding member 82 has a thickness much smaller than that of the frame 27 and is preferable to reduce the frame width of the backlight device. The side wall of the casing 14 has a thickness of approximately 1.5 mm and the frame width of the liquid crystal display device 1210 is approximately 2.2 mm if the backlight device 1213 is mounted in the casing 14 with mounting tolerance of 0.1 mm. In the present embodiment, screen luminance of the backlight device 1213 is approximately 530 $cd/m^2$ and the screen luminance is improved compared to a backlight device without including the light reflecting portion 34.

In the configuration including the surrounding member 82, the light exit surface 24b of the light guide plate 24 is covered with the surrounding member 82 and therefore, the surrounding member 82 is required to have good transmissivity. In a configuration without including the light reflecting portion 34, most of the rays of light leaking through the opposite edge surface 24d of the light guide plate 24 passes the surrounding member 82 and leaks outside. Therefore, the light leaking through the opposite edge surface 24d does not return into the light guide plate 24 and does not exit through the light exit surface 24b. In the present embodiment, with the configuration including the light reflecting portion 34, the leaking light reflects off the light reflecting portion 34 and exits through the light exit surface 24*b* and brightness of the backlight device 1213 is effectively improved.

Fourteenth Embodiment

Figure 27:
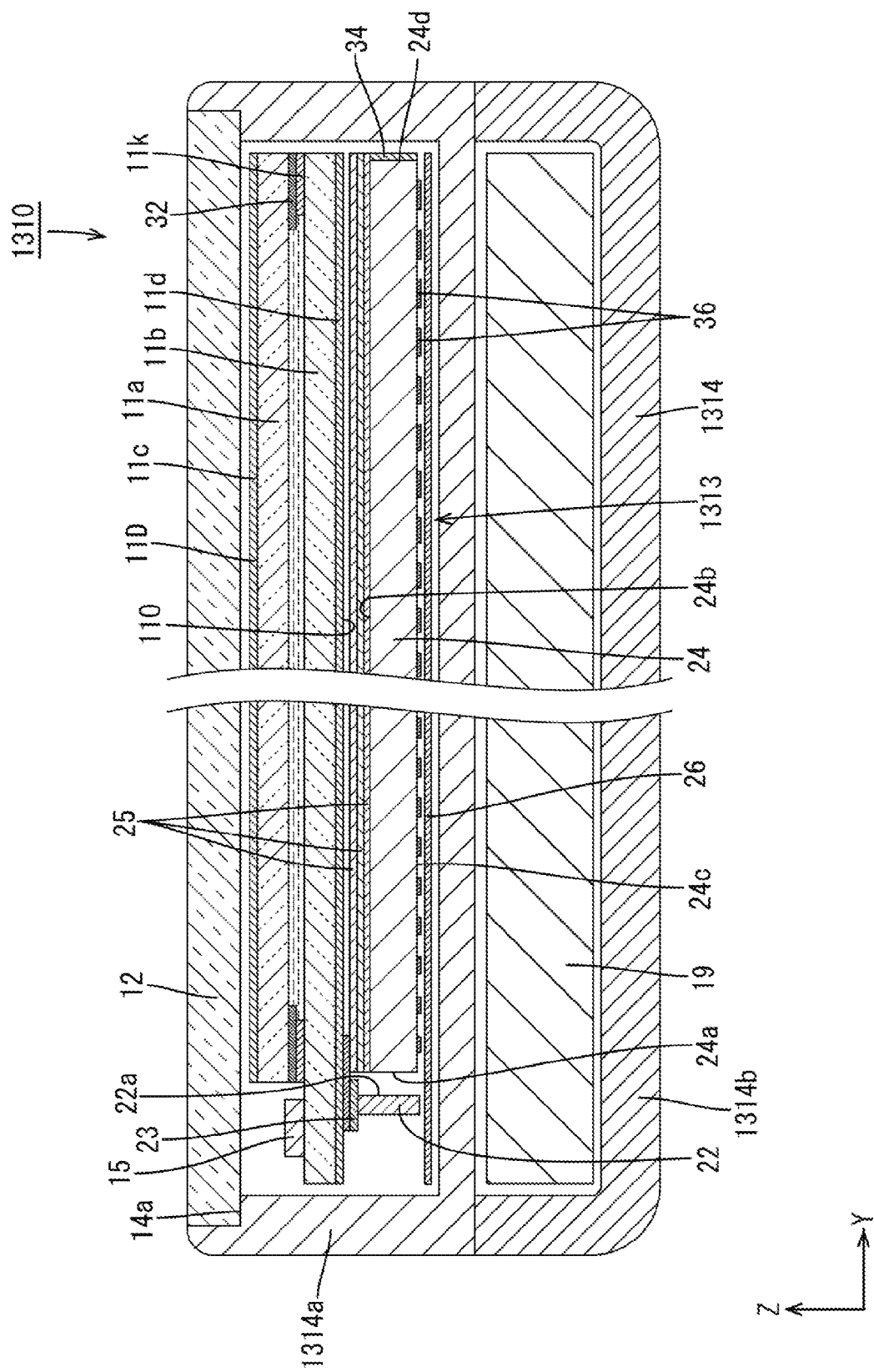
FIG. 27 is a cross-sectional view of a liquid crystal display device taken along a long-side direction thereof according to a fourteenth embodiment.

Next, a fourteenth embodiment of the present invention will be described with reference to FIG. 27. In a liquid crystal display device 1310 of the present embodiment, a backlight device 1313 does not include the frame 27, and the light guide plate 24 is arranged in a casing 1314 such that the opposite edge surface 24*d* faces an inner surface of the casing 1314 unlike the first embodiment. In other words, the casing 1314 is configured to include a configuration of the frame 27.

The casing 1314 includes two separate components including a front-side casing member (casing member) 1314*a* and a rear-side casing member 1314*b*. The liquid crystal panel 11 and the backlight device 1313 are arranged in the front-side casing member 1314*a*. The rear-side casing member 1314*b* is arranged on a rear-surface side with respect to the front-side casing member 1314*a*. Boards such as a control board for controlling driving of the liquid crystal panel 11 and a LED driving board for supplying driving power to the LEDs 22, and batteries 19 are arranged in the rear-side casing member 1314*b*. The rear-side casing member 1314*b* is fixed to the front-side casing member 1314*a* with an adhesive layer, double-sided adhesive tape, screws, or projections, which are not illustrated.

The front-side casing member (casing member) 1314*a* is made of metal having light reflectivity. The material of the front-side casing member 1314*a* is not limited thereto but may be synthetic resin having light reflectivity. The front-side casing member 1314*a* has a substantially box shape and includes a bottom surface 72*a*, and side walls 72*b* extending upward from an outer peripheral edge of the bottom surface 72*a*. The side walls 72*b* face the edge surfaces 24*a*, 24*d*, 24*c*, 24*f* of the light guide plate 24. The front-side casing member 1314*a* has a cover panel placing surface 14*a* at an inner peripheral surface of an opening thereof. The cover panel placing surface 14*a* is formed by cutting away a part of the inner peripheral surface of the opening. The cover panel 12 is fixed on the cover panel placing surface 14*a* with an adhesive layer (not illustrated) to cover the opening of the front-side casing member 1314*a*.

The liquid crystal panel 11 is adhered on the cover panel 12 via a transparent adhesive layer called optically clear adhesive (OCA) and is fixed to the front-side casing member 1314*a* via the cover panel 12. In FIG. 27, a configuration of a touch panel is not illustrated, however, the touch panel may be adhered closely between the cover panel 12 and the liquid crystal panel 11, if necessary. The cover panel 12 may include a function of the touch panel or the liquid crystal panel 11 may include a function of the touch panel.

The backlight device 1313 has a backlight frame from the edge surface of the light guide plate 24 to an outer peripheral edge of the backlight device 1313. In the present embodiment, each of the opposite edge surface 24*d* and the edge surfaces 24*e*, 24*f* of the light guide plate 24 is the outer peripheral edge of the backlight device 1313. The light guide plate 24 is arranged such that each of the opposite edge surface 24*d* and the edge surfaces 24*e*, 24*f* directly faces the casing 14 and a dimension of the backlight frame is substantially 0 mm. The side wall of the casing 14 has a thickness of approximately 1.5 mm and the frame width of the liquid crystal display device 1310 is approximately 2.2 mm if the backlight device 13 is mounted in the casing 14 with mounting tolerance of 0.1 mm. In the present embodiment, screen luminance of the backlight device 13 is approximately 530 cd/m² and the screen luminance is improved compared to a backlight device without including the light reflecting portion 34.

Fifteenth Embodiment

Figure 28:
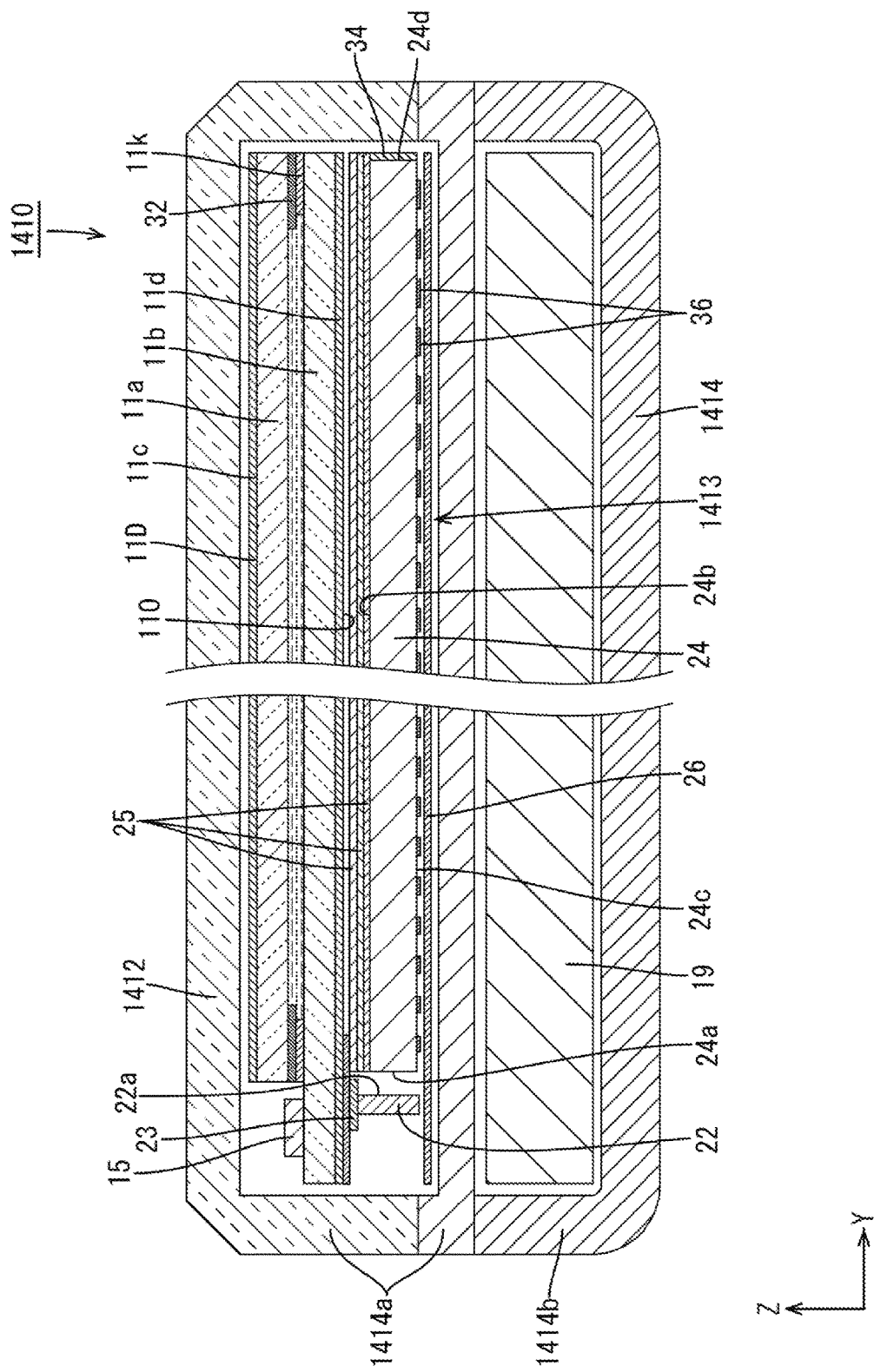
FIG. 28 is a cross-sectional view of a liquid crystal display device taken along a long-side direction thereof according to a fifteenth embodiment.

Next, a fifteenth embodiment of the present invention will be described with reference to FIG. 28. In the present embodiment, configurations of a cover panel (casing member) 1412 and a casing 1414 differ from those of the cover panel 12 and the casing 1314 of the fourteenth embodiment.

The cover panel (casing member) 1412 is made of tempered glass having high transmissivity. The material of the cover panel 1412 is not limited thereto but may be made of synthetic resin having light transmissivity. The cover panel 1412 has a substantially box shape and includes a cover portion 1412*a* covering a display surface 11D of the liquid crystal panel 11 and side wall portions 1412*b* extending upward from an outer peripheral edge of the cover portion 1412*a*. The side wall portions 1412*b* face the edge surfaces 24*a*, 24*d*, 24*c*, 24*f* of the light guide plate 24. The liquid crystal panel 11 and the backlight device 13 are arranged in the cover panel 1412 sequentially in this order. The fixing method of the liquid crystal 11 on the cover portion 1412*a* is same as that of the fourteenth embodiment and will not described.

The casing 1414 includes two separate components including a front-side casing member 1414*a* and a rear-side casing member 1414*b*. The front-side casing member 1414*a* is disposed on a rear-surface side with respect to the cover panel 1412 to close the opening thereof. The rear-side casing member 1414*b* is arranged on a rear-surface side with respect to the front-side casing member 1414*a*. Boards such as a control board for controlling driving of the liquid crystal panel 11 and a LED driving board for supplying driving power to the LEDs 22, and batteries 19 are arranged in the rear-side casing member 1414*b*. The rear-side casing member 1414*b* is fixed to the front-side casing member 1414*a* with an adhesive layer, double-sided adhesive tape, screws, or projections, which are not illustrated. The front-side casing member 1414*a* is fixed to the cover panel 1412 via an adhesive layer (not illustrated).

In the configuration that the cover panel 1412 faces the edge surfaces of the light guide plate 24 and the light reflecting portion 34 is not included, most of the rays of light leaking through the opposite edge surface 24*d* of the light guide plate 24 passes the cover panel 1412 and leaks outside. Therefore, the light leaking through the opposite edge surface 24*d* does not return into the light guide plate 24 and does not exit through the light exit surface 24*b*. In the present embodiment, with the configuration including the light reflecting portion 34, the leaking light reflects off the light reflecting portion 34 and exits through the light exit surface 24*b* and brightness of the backlight device 1413 is effectively improved.

Other Embodiments

The present invention is not limited to the embodiments, which have been described using the foregoing descriptions and the drawings. For example, embodiments described below are also included in the technical scope of the present invention.

(1) In the above embodiments, the light guide plate 24 includes the light reflecting portion 34 on the edge surfaces 24e, 24f. However, it is not limited thereto and in other embodiments, the light reflecting portion 34 may not be formed on the edge surfaces 24e, 24f.

(2) In the above embodiments, the other plate surface-side light reflecting portion 34 is formed on the rear-side plate surface 24c. However, it is not limited thereto and in other embodiments, the other plate surface-side light reflecting portion 34 may not be included.

(3) In the above embodiments, the light blocking layer 32, 132 is included in the liquid crystal panel. However, it is not limited thereto and in other embodiments, a separately formed light blocking layer may be disposed between components of the liquid crystal panel or the backlight device or the light blocking layer may be formed on the cover panel.

(4) Other than each of the above embodiments, a touch panel (position information detection panel) may be included between the cover panel and the liquid crystal panel. In such a configuration, the cover panel may be fixed to the touch panel with adhesive and the liquid crystal panel may be fixed to the touch panel with adhesive. In other configuration, a touch panel pattern may be formed on the cover panel and the cover panel may have a touch panel function (position information detection function). A touch panel pattern of the touch panel may be a projection type capacitance t pane surface capacitance-type touch panel, a resistance film type touch panel, and an electromagnetic induction type touch panel.

(5) Other than each of the above embodiments, a parallax barrier panel may be included between the cover panel and the liquid crystal panel. In such a configuration, the cover panel may be fixed to the parallax barrier panel with adhesive and the liquid crystal panel may be fixed to the parallax barrier panel with adhesive. The parallax barrier panel has a parallax barrier pattern with which an image displayed on the display surface of the liquid crystal panel is separated by parallax and the image is seen by an observer as a stereoscopic image (3D image, three dimensional image). With such a configuration that the liquid crystal panel is used as the parallax barrier panel, display images may be switched between flat images (2D images, two dimensional images) and stereoscopic images.

(6) In each of the above embodiments, the frame has a rectangular cross sectional shape. However, it is not limited thereto and a frame may have steps with surfaces where components are placed in other embodiments. The frame may have a stepped cross sectional shape.

(7) In each of the above embodiments, the liquid crystal panel is fixed to the backlight device with a panel adhesive tape. However, the liquid crystal panel may be mounted in the backlight device with a method other than the adhesive tape (such as screws or rivets).

(8) Other than each of the above embodiments, backlight devices and liquid crystal display devices having various shapes may be included in the scope of the present invention (9) In each of the above embodiments, the LEDs are used as the light source. In other embodiments, other type of light source may be used as long as the object of the present invention is achieved.

(10) In the above embodiments, the liquid crystal display device including the liquid crystal panel as the display panel is used. In other embodiments, other type of display panel using a lighting device may be used as long as the object of the present invention is achieved.

(11) Each of the above embodiments includes the TFTs as switching components of the liquid crystal display device. However, switching components other than the TFTs (such as thin film diodes (TFDs)) may be included in the scope of the present invention. Furthermore, a liquid crystal display device configured to display black and white images other than o the liquid crystal display device configured to display color images.

EXPLANATION OF SYMBOLS 10, 110, 510, 610, 1310: liquid crystal display device (display device), 11: liquid crystal panel (display panel), 13, 113, 213, 313, 413, 513, 613, 1213, 1413: backlight device (lighting device), 22: LED (light source), 24, 224, 324, 424, 524, 624, 824, 1924: light guide plate, 24a: light entrance surface, 24b: light exit surface, 24d, 324d, 524d, 624d, 824d, 1024d: opposite edge surface, 34, 134, 534, 634, 834, 934: light reflecting portion, 36: other plate surface-side light reflecting portion, 42, 944: protection plate member, 942: edge surface of protection plate member, 52: screen, 72: metal frame, 82: surrounding member, 524g: inner peripheral edge surface, 524H: through hole, 535: inner peripheral surface light reflecting portion, 1314a: front-side casing member (casing member), 1412: cover panel (casing member)

The invention claimed is:

1. A lighting device comprising:
    a light source;
    a light guide plate that is a plate member and includes:
        a light entrance surface,
        an opposite edge surface,
        a light exit surface, and
        a through hole extending through a thickness of the light guide plate, wherein the light entrance surface is an edge surface of the plate member opposite to the light source and through which light emitted by the light source enters the light guide plate, the opposite edge surface is another edge surface of the plate member that is on an opposite side from the light entrance surface, and the light exit surface is a plate surface of the plate member and through which the light entering through the light entrance surface exiting the light guide plate;
    a light reflecting portion adhered on the opposite edge surface and reflecting light travelling within the light guide plate toward the opposite edge surface; and
    an inner peripheral surface light reflecting portion adhered on an inner peripheral edge surface of the through hole and reflecting light travelling within the light guide plate toward the through hole.

2. The lighting device according to claim 1, wherein
    the light guide plate includes at least a curved edge surface having a curved plan view shape, and
    the light reflecting portion is on the curved edge surface.

3. The lighting device according to claim 1, further comprising:
    an other plate surface-side light reflecting portion on another plate surface of the plate member of the light guide plate to reflect light travelling within the light guide plate toward the other plate surface in a direction toward the light exit surface, wherein
    the opposite edge surface is an inclined surface inclined with respect to the other plate surface at an obtuse angle.

4. A method of manufacturing the light reflecting portion of the lighting device according to claim 3, the method comprising:
    forming the light reflecting portion and the other plate surface-side light reflecting portion collectively with screen printing using a flexible screen.

5. A method of manufacturing the light reflecting portion of the lighting device according to claim 3, the method comprising:

pressing a flexible pad member onto the opposite edge surface and the other plate surface and forming the light reflecting portion and the other plate surface-side light reflecting portion collectively with pad printing.

6. The lighting device according to claim 1, further comprising:

an other plate surface-side light reflecting portion on another plate surface of the plate member of the light guide plate to reflect light travelling within the light guide plate toward the other plate surface in a direction toward the light exit surface, wherein the opposite edge surface is a curved surface, and a tangent line to the curved surface and the other plate surface form an obtuse angle.

7. The lighting device according to claim 1, wherein the light reflecting portion is formed on an edge portion of the light exit surface near the opposite edge surface, the opposite edge surface, and an edge portion of the other plate surface near the opposite edge surface side, and the light reflecting portion is in a cross-sectional U shape.

8. A method of manufacturing the light reflecting portion of the lighting device according to claim 7, the method comprising:

arranging multiple light guide plates and protection plate members for protecting the plate surfaces of the light guide plate alternately in a thickness direction without having space therebetween such that edge surfaces of the protection plate members are recessed from the opposite edge surfaces of the light guide plates, and forming a coating film containing particles having light reflectivity or a metal thin film having light reflectivity on opposite edge surface side edge portions of the light exit surfaces of the light guide plates, the opposite edge surfaces of the light guide plates, and opposite edge surface side edge portions of the other plate surfaces of the light guide plates and forming the light reflecting portion collectively on the light guide plates.

9. The lighting device according to claim 1, further comprising:

a resin frame made of synthetic resin having light reflectivity and extending to face the edge surfaces of the light guide plate and surround at least the light source and the light guide plate.

10. The lighting device according to claim 1, further comprising:

a metal frame made of metal having light reflectance lower than that of the light reflecting portion and receiving at least the light source and the light guide plate therein.

11. The lighting device according to claim 1, further comprising:

a surrounding member having light reflectivity and covering the light exit surface and the opposite edge surface and collectively surround at least the light source and the light guide plate to be mounted in each other.

12. A display device comprising:

the lighting device according to claim 1; and a display panel displaying images using light from the lighting device.

13. The display device according to claim 12, further comprising:

a casing member where the lighting device and the display panel are arranged and having a box shape including side walls that are opposite the edge surfaces of the light guide plate.

14. A method of manufacturing the light reflecting portion of the lighting device according to claim 1, the method comprising:

arranging multiple light guide plates in a thickness direction thereof without having any space therebetween such that the opposite edge surface of each of the light guide plates is flush with each other, and forming a coating film containing particles having light reflectivity or a metal thin film having light reflectivity on opposite edge surfaces of the light guide plates such that the light reflecting portion is formed collectively on the light guide plates.

15. A method of manufacturing a lighting device comprising:

forming a light reflecting portion by:

arranging multiple light guide plates in a thickness direction thereof without having any space therebetween such that an opposite edge surface of each of the light guide plates is flush with each other, and forming a coating film containing particles having light reflectivity or a metal thin film having light reflectivity on the opposite edge surface of each of the light guide plates such that the light reflecting portion is formed on each of the light guide plates, wherein the lighting device includes:

a light source;

one of the light guide plates that is a plate member and includes a light entrance surface, the opposite edge surface, and a light exit surface, the light entrance surface being an edge surface of the plate member and opposite the light source and through which light emitted by the light source enters the one of the light guide plates, the opposite edge surface being another edge surface of the plate member that is on an opposite side from the light entrance surface, and the light exit surface being a plate surface of the plate member and through which the light entering through the light entrance surface exiting the one of the light guide plates; and a light reflecting portion disposed on at least the opposite edge surface and reflecting light travelling within the one of the light guide plates toward the opposite edge surface.

16. A method of manufacturing a lighting device comprising:

forming a light reflecting portion by:

arranging multiple light guide plates and protection plate members that protect plate surfaces of the light guide plate alternately in a thickness direction without having space therebetween such that edge surfaces of the protection plate members are recessed from a opposite edge surface of each of the of light guide plates, and forming a coating film containing particles having light reflectivity or a metal thin film having light reflectivity on opposite edge surface side edge portions of the light exit surfaces of the light guide plates, the opposite edge surfaces of the light guide plates, and opposite edge surface side edge portions of the other plate surfaces of the light guide plates and forming the light reflecting portion collectively on the light guide plates, wherein the lighting device includes:
- a light source;
- one of the light guide plates that is a plate member and includes a light entrance surface, the opposite edge surface, and a light exit surface, the light entrance surface being an edge surface of the plate member and opposite the light source and through which light emitted by the light source enters the one of the light guide plates, the opposite edge surface being another edge surface of the plate member that is on an opposite side from the light entrance surface, and the light exit surface being a plate surface of the plate member and through which the light entering through the light entrance surface exiting the one of the light guide plates; and
- a light reflecting portion disposed on at least the opposite edge surface and reflecting light travelling within the one of the light guide plates toward the opposite edge surface, the light reflecting portion is formed on an edge portion of the light exit surface near the opposite edge surface, the opposite edge surface, and an edge portion of the other plate surface near the opposite edge surface side, and the light reflecting portion is formed in a cross-sectional U shape.

* * * * *